United States Patent [19]
Smith et al.

[11] Patent Number: 5,606,505
[45] Date of Patent: Feb. 25, 1997

[54] METHOD OF AIRPLANE PERFORMANCE ESTIMATION AND PREDICTION

[75] Inventors: Joseph A. Smith, Phoenix; Erik A. Ringnes; Victor F. Tarbutton, both of Glendale, all of Ariz.

[73] Assignee: Honeywell Inc., Minneapolis, Minn.

[21] Appl. No.: 451,780

[22] Filed: May 26, 1995

Related U.S. Application Data

[63] Continuation-in-part of Ser. No. 122,214, Sep. 17, 1993, abandoned.

[51] Int. Cl.$^6$ .................................................. G05D 1/00
[52] U.S. Cl. ........................ 364/431.01; 364/427; 364/428
[58] Field of Search .................. 364/431.01, 424.06, 364/551.01, 149, 151, 427, 428, 424.01; 244/180, 194

[56] References Cited

U.S. PATENT DOCUMENTS

| | | | |
|---|---|---|---|
| 4,837,695 | 6/1989 | Baldwin | 364/551.01 |
| 4,843,554 | 6/1989 | Middleton et al. | 364/427 |
| 4,868,755 | 9/1989 | McNulty et al. | 364/424.01 |
| 4,980,833 | 12/1990 | Milligan et al. | 364/427 |
| 5,023,797 | 6/1991 | Lappos et al. | 364/431.01 |
| 5,070,458 | 12/1991 | Gilmore et al. | 364/424.06 |

OTHER PUBLICATIONS

Stevens et al., *Aircraft Control and Simulation*, John Wiley & Sons, Inc., NY, 1992, pp. 139–152.
Nelms, Jr. et al., "Preliminary Performance Estimates of an Oblique, All-Wing, Remotely piloted Vehicle for Air-to-Air Combat", NASA Ames Research Center, Moffett Field, CA, Jul. 1974, Abstract Only.

*Primary Examiner*—Kevin J. Teska
*Assistant Examiner*—Stephen J. Walder, Jr.
*Attorney, Agent, or Firm*—Brian C. Downs; Mark J. Gebhardt; Ronald E. Champion

[57] ABSTRACT

A method of predicting performance characteristics of an aircraft including modeling thrust-minus-drag of an aircraft with at least one mathematical model using aircraft specific data and input parameters which define the performance characteristics. Coefficients of the at least one mathematical model are learned over at least one flight. The performance characteristics are predicted as a function of the learned coefficients representative of a combined and non-independent thrust-minus-drag relationship.

41 Claims, 9 Drawing Sheets

METHOD OF AIRPLANE PERFORMANCE ESTIMATION AND PREDICTION

This application is a continuation-in-part, of application Ser. No. 08/122,214, filed Sep. 17, 1993 now abandoned.

FIELD OF THE INVENTION

The present invention relates to flight management systems. In particular, the present invention pertains to a method of estimating, and subsequently predicting, aircraft performance.

BACKGROUND OF THE INVENTION

In the past, a "rule of thumb" method was utilized in predicting aircraft performance characteristics. With this technique, the pilot, based on previous experience, makes a reasonable estimate of the aircraft performance characteristics. Other past aircraft performance prediction systems include a custom performance computer which utilized "average parameters" for a predetermined model of an aircraft. This average parameter method is useful for only one aircraft type, and must be repeated for each new type of aircraft. These methods and systems have other inaccuracies associated therewith. For example, the rule of thumb method is very inaccurate since it is difficult to compensate for temperature of the air, weight of the aircraft, etc. Also, this method usually adds to the pilot workload at a time when the pilot is already very busy. The custom performance computer method, in addition to the average parameter disadvantage, does not account for manufacturing tolerances, a degradation of parameters resulting from age and usage, nor for different pilot techniques.

U.S. Pat. No. 5,070,458 to Gilmore, et al., entitled "Method of Analyzing and Predicting both Airplane and Engine Performance Characteristics," issued Dec. 3, 1991, describes a method which overcomes many of these disadvantages. This method makes performance predictions for an individual aircraft and engine using parameters which are learned from "flight to flight." The data, which is used by this method for predicting performance characteristics, is initialized with reasonable values of specific performance parameters. This method includes adjustment or updating of the specific performance parameters resulting from each flight of the aircraft. Thus, the performance characteristics of a given aircraft are learned from flight to flight for use in future flights of the given aircraft. The learned parameter technique thereby adjusts to changes in the aircraft due to aging, is tailored to a specific aircraft, and accounts for manufacturing tolerances. However, in Gilmore, et al., the modeling utilized and the computation of terms thereof are inefficient. In addition, Gilmore, et al. uses a model which separates thrust and drag terms of the model when making predictions and is somewhat limited in the number of outputs produced. For example, Gilmore does not provide for predictions of long range cruise speed or optimum altitude, which are important for achieving the best possible fuel efficiency.

In view of prior estimation and prediction systems, a need is apparent for a prediction system which provides an enhanced set of outputs for use by the pilot. In addition, the outputs, which may include outputs previously computed by prior systems, should be provided with greater speed and/or improved accuracy.

SUMMARY OF THE INVENTION

The present invention provides an estimation and prediction method which provides an enhanced set of outputs which are provided with greater speed and/or accuracy. An estimating method for use in predicting performance characteristics of an aircraft in accordance with the present invention includes modeling the aircraft with at least one series expansion using aircraft specific data, such as wing reference area, and input parameters, such as current weight or altitude, which define the performance characteristics. Coefficients of the at least one series expansion are learned over at least one flight so that the learned coefficients can be utilized for predicting performance characteristics of subsequent flights. A thrust and drag relationship may be modeled with a first series expansion and climb fuelflow of the aircraft may be modeled with a second series expansion. A first and second filter are utilized for estimating the coefficients of the first and second series expansions, respectively.

In another method of the present invention, a method of predicting the performance characteristics of an aircraft includes modeling the aircraft with at least one mathematical model using aircraft specific data and input parameters which define the performance characteristics. Coefficients of the mathematical model are learned during at least one flight and cruise performance characteristics are predicted as a function of the learned coefficients of the mathematical model. Long range cruise speed, maximum cruise speed and optimum altitude at both such speeds are predicted. These performance characteristics are computed using the mathematical model and a given set of input parameters, e.g. long range cruise speed at a given weight and altitude. These computations are optimized by differentiating functions derived from the mathemtical model with respect to each independent input parameter. In another method of the present invention, parameters such as total fuel burned for a given flightplan are computed with minimum iterations utilizing closed-form integration. The ability to differentiate the mathematical model is necessary to such integration.

An additional embodiment of the present invention includes a method of predicting performance characteristics of an aircraft including modeling thrust-minus-drag of an aircraft with at least one mathematical model using aircraft specific data and input parameters which define the performance characteristics. Coefficients of the at least one mathematical model are learned. Performance characteristics are predicted as a function of the learned coefficients representative of a combined and non-independent thrust-minus-drag relationship. The certain performance characteristics are a function only of the non-independent or combination thrust-minus-drag relationship, and not of thrust and drag independently. These predictions are of considerably greater accuracy than those depending on explicit knowledge of thrust and drag separately.

BRIEF DESCRIPTION OF THE DRAWINGS

FIG. 7, including

FIG. 8, including

DETAILED DESCRIPTION OF THE PREFERRED EMBODIMENT

Figure 1:
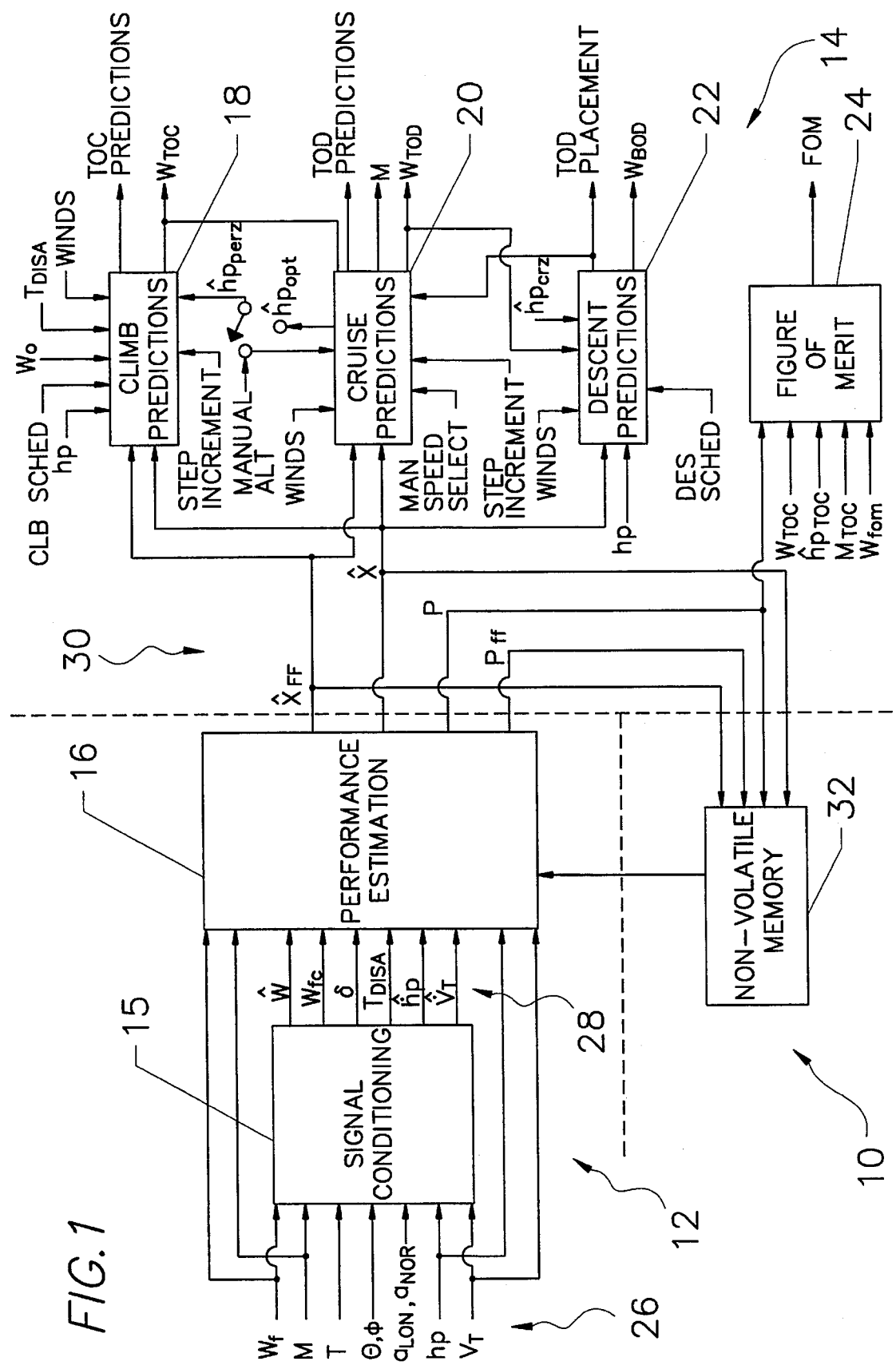
FIG. 1 shows a general block diagram of the method of airplane performance estimation and prediction in accordance with the present invention.

The method of aircraft performance estimation and prediction 10 shall be described in general with reference to FIG. 1. The aircraft performance estimation and prediction method 10 includes two major portions, a learning portion 12 and a predicting portion 14. The learning portion 12 includes modeling a thrust-minus-drag relationship of an aircraft with a Taylor series expansion utilizing signal input parameters 26, such as current aircraft weight and altitude, and aircraft specific data, such as wing reference area, stored in non-volatile memory 32. Additionally, fuel flow at the climbing rate is modeled with another Taylor series expansion utilizing signal input parameters 26 and aircraft specific data. Performance estimation 16 receives conditioned signal inputs 28, and preferably utilizing Kalman filter techniques, estimates the coefficients of the Taylor series expansions of both the modeled thrust-minus-drag relationship and climb fuel flow over the course of multiple flights. The learning portion 12 yields performance estimate outputs 30 including fuel flow estimate vector $\hat{x}_{ff}$, thrust-minus-drag estimate vector $\hat{x}$, and covariance matrices P and $P_{ff}$, of which P provides data for determining how accurate the system will predict aircraft performance characteristics utilizing figure of merit block 24 of prediction portion 14. The learned coefficients of the Taylor series expansions for the thrust-minus-drag relationship and fuel flow along with their respective covariance matrices are retained in non-volatile memory 32 and are therefore available during subsequent flights to refine the existing estimates utilizing learning portion 12 and to predict aircraft performance characteristics with climb predictions block 18, cruise predictions block 20 and descent predictions block 22.

The prediction portion 14 utilizes Newtons-method-related techniques to find certain points of interest on curves or surfaces representative of functions derived from the thrust-minus-drag relationship and fuelflow to be maximized or otherwise localized given particular constraints. Aircraft performance characteristics such as long range cruise speed, maximum speed, maximum and optimum altitudes and combinations thereof are examples of characteristics which are computed in this manner. Newtons-method-related techniques rely heavily on the ability to differentiate various functions of interest. This ability in turn depends ultimately on the ability to differentiate the thrust-minus-drag function and fuelflow which are expressed as Taylor series expansions whose coefficients are provided directly by performance estimation 16 and whose derivatives are readily available.

With the learned coefficients of the Taylor series expansions and respective covariance matrices retained in non-volatile memory 32, the data can be downloaded and utilized for initializing or "seeding" a new example aircraft of similar type. For example, a first aircraft can be utilized in the learning process, while the data learned can be used to seed the learning process of a second similar type aircraft or used for predictions of the second aircraft characteristics. In addition, with the coefficients and covariance matrices in non-volatile memory, the pilot is allowed to save the data if a box of the system is pulled for any reason. It can then be reloaded when desired mitigating the need to completely restart the estimation process.

With reference to FIGS. 1–14, the present invention shall be described in further detail. The non-volatile memory 32 includes an aircraft data file which is used for performance predictions once sufficient learning has taken place and also for continuing the learning process. Sufficient learning in the learning portion 12 has taken place to begin the prediction portion 14 usually after about 3–4 flights. The aircraft data file is divided into two parts. The first file part contains data that is independent of learning, but still aircraft specific. This aircraft specific data includes the following:

aircraft type aircraft tail number ceiling altitude (feet), $h_{ceil}$ default climb constant calibrated air speed (KCAS)

default climb Mach default descent KCAS default descent Mach takeoff fuel allowance (lbs)

landing fuel allowance (lbs)

basic operating flight weight (BOW) (lbs)

wing platform area (ft**2), S maximum operating airspeed, Vmo (KCAS)

maximum operating mach number, Mmo maximum lift coefficient, $C_{L_{ref}}$ critical mach number, $M_{cr}$ The second file part of the aircraft data file contains the learned coefficients of both the Taylor series expansions and their respective covariance matrices. The learned data of the second file part of the aircraft data file includes:

11 coefficients for the thrust-minus-drag Kalman filter 5 coefficients for the rated-fuelflow Kalman filter the upper triangle of the eleven-by-eleven covariance matrix including the diagonal elements describing the thrust-minus-drag filter (a total of 66 values)

the upper triangle of the five-by-five covariance matrix including the diagonal elements describing the rated-fuelflow filter (a total of 15 values).

As indicated above, the aircraft is modeled by use of Taylor series expansions of thrust-minus-drag and rated fuelflow about a given reference point. For the remainder of the present description, given a Taylor series expansion of the function z=f(x,y) of the form:

$$z \approx f(x,y)|_{x=x_o,y=y_o} + \frac{\partial f}{\partial x}|_{x=x_o,y=y_o}(x-x_o) +$$
$$\frac{\partial f}{\partial y}|_{x=x_o,y=y_o}(y-y_o)$$
$$= f_o + f_{x_o}\Delta x + f_{y_o}\Delta y$$

then $f_o$, $f_{x_o}$, $f_{y_o}$, etc. will be referred to as coefficients of the series, $\Delta x$, $\Delta y$ (or x and y with the "$-x_o$" understood), etc. will be referred to as parameters of the series, and $f_{x_o}\Delta x$, etc. are terms of the series.

The terms "coefficients" and "parameters" are also used in the context of a general mathematical model.

The Taylor series expansion for the thrust portion T of the thrust-minus-drag relationship is expressed as:

$$T = \delta\left(T/\delta|_0 + \frac{\partial(T/\delta)}{\partial M}|_0\Delta M + \frac{\partial(T/\delta)}{\partial W_{fc}}|_0\Delta W_{fc} + \right.$$
$$\left. \frac{\partial(T/\delta)}{\partial h_p}|_0\Delta h_p + \frac{\partial^2(T/\delta)}{\partial M^2}|_0\Delta M^2 + \right.$$
$$\left. \frac{\partial^2(T/\delta)}{\partial M\partial W_{fc}}|_0\Delta M\Delta W_{fc}|_0\Delta M\Delta W_{fc} + \frac{\partial^2(T/\delta)}{\partial W_{fc}^2}|_0\Delta W_{fc}^2\right)$$

where M is Mach number, $\delta$ is pressure ratio, $W_{fc}$ is corrected fuelflow defined further below, $h_p$ is pressure altitude, and $|_o$ indicates the preceding term is to be evaluated at the midpoints $M_o$, $W_{fc_o}$ and $h_{p_o}$ which are also further defined below.

The drag portion D of the thrust-minus-drag relationship is expressed as:

$$D = 1481\delta M^2 SC_D = C_1\delta M^2 C_D$$

where $C_1 = 1481S$

S=wing reference area $C_D$=coefficient of drag

The coefficient of drag $C_D$ is modeled as:

$$C_D = C_{d_i}(1+\Gamma)$$

where $C_{D_i}$=coefficient of drag-incompressible flow $\Gamma$=compressibility correction as described below.

The incompressible drag coefficient $C_{D_i}$ is modeled as:

$$C_{D_i} = C_{D_0} + C_{D_l}C_L + kC_L^2$$

where $C_L$=coefficient of lift $C_{D_0}$, $C_{D_l}$, & k are coefficients to be learned.

Since lift L can be written as $C_l\delta M^2 C_L$ and is equal to weight W in flight, drag D can be expressed as:

$$D = \left(C_l\delta M^2 C_{D_0} + WC_{D_l} + \frac{W^2}{C_l\delta M^2}k\right)(1+\Gamma)$$

The compressibility correction term $\Gamma$ is expressed as:

$\Gamma = 0$ when $M \leq M_{cr}$ $\Gamma = 15(M-M_{cr})^2\tan[(M-M_{cr})^2)(C_L^3+0.1)\lambda]$ when $M > M_{cr}$ where $M_{cr}$=critical mach number $\lambda$=coefficient to be learned Combining the expressions for thrust and drag, the thrust-minus-drag relationship T–D is modeled as follows:

$$T - D = [x_1 + x_2\Delta M + x_3\Delta W_{fc} + x_4\Delta h_p + x_5\Delta M^2 +$$
$$x_6\Delta M\Delta W_{fc} + x_7\Delta W_{fc}^2] -$$
$$\left[x_8 C_1\delta M^2 + x_9 W + x_{10}\frac{W^2}{C_1\delta M^2}\right](1+\Gamma)$$

where $$x_1 = T/\delta|_o, x_2 = \frac{\partial(T/\delta)}{\partial M}|_o, x_3 = \frac{\partial(T/\delta)}{\partial W_{fc}}|_o, x_4 = \frac{\partial(T/\delta)}{\partial h_F}|_o,$$

$$x_5 = \frac{\partial^2(T/\delta)}{\partial M^2}|_o, x_6 = \frac{\partial^2(T/\delta)}{\partial M\partial W_{fc}}|_o, x_7 = \frac{\partial^2(T/\delta)}{\partial W_{fc}^2}|_o,$$

$$x_8 = C_{D_0}, x_9 = C_{D_l}, x_{10} = k, x_{11} = \lambda$$

Taken collectively, the coefficients $x_1$, $x_2$, etc. can be expressed in vector form as $x=[x_1, \ldots x_{11}]^T$. The performance estimation portion 16 of the present invention develops estimates of these true coefficients; the estimates denoted by $\hat{x}_1$, $\hat{x}_2$, etc. or by the vector $\hat{x}$.

The 11-term Taylor series expansion allows more degrees of freedom than did the prior art, resulting in the modeling of significant higher order effects which yield better results. Also, the altitude $h_p$ becomes an intrinsic part of the modeling in the present invention, unlike other methods of estimation and prediction which utilize an "after the fact" curve fit of altitude with other parameters.

The reference point about which the Taylor series is expanded is chosen for best fit over typical operating conditions. In the preferred embodiment, it is defined to be $M_o = 0.60$ mach, $h_{po} = 30,000$ feet, and $W_{fco} = 7,400$ lbs/hr, thus:

$$\Delta M = M - 0.60;\ \Delta h = h_p - 30,000;\ \Delta W_{fc} = W_{fc} - 7,400$$

The rated fuelflow, also modeled by a Taylor series expansion, is expressed as:

$$W_{f_r} = W_{f_r}|_o + \frac{\partial W_{f_r}}{\partial M}|_o\Delta M + \frac{\partial W_{f_r}}{\partial h_p}|_o\Delta h +$$
$$\frac{W_{f_r}}{\partial T}|_o T_{DISA} + \frac{\partial^2 W_{f_r}}{\partial T\partial h_p}|_o\Delta h T_{DISA}$$

where $T_{DISA} = T - T_{ISA}$; $T_{ISA}$ being standard temperature, or may be expressed as:

$$W_{f_r} = x_{ff1} + x_{ff2}\Delta M + x_{ff3}\Delta h + x_{ff4}T_{DISA} + x_{ff5}\Delta h T_{DISA}$$

where $$x_{ff1} = W_{f_r}|_o, x_{ff2} = \frac{\partial W_{f_r}}{\partial M}|_o, x_{ff3} = \frac{\partial W_{f_r}}{\partial h_p}|_o,$$

-continued $$x_{ff_r} = \frac{\partial W_{f_r}}{\partial T}\bigg|_o, x_{ff_s} = \frac{\partial^2 W_{f_r}}{\partial T \partial h_p}\bigg|_o$$

The rated fuelflow $W_{fr}$ is modeled by the Taylor series expansion about the same reference point as thrust-minus-drag is modeled. Taken collectively, the coefficients $x_{ff1} \ldots x_{ff5}$ can be expressed in vector form as $x_{ff}=[x_{ff1} \ldots x_{ff5}]^T$. The performance estimation portion 16 of the present invention develops estimates of the coefficients; the estimates denoted by $\hat{x}_{ff1} \ldots \hat{x}_{ff5}$ or by the vector $\hat{x}_{ff}$.

Figure 2:
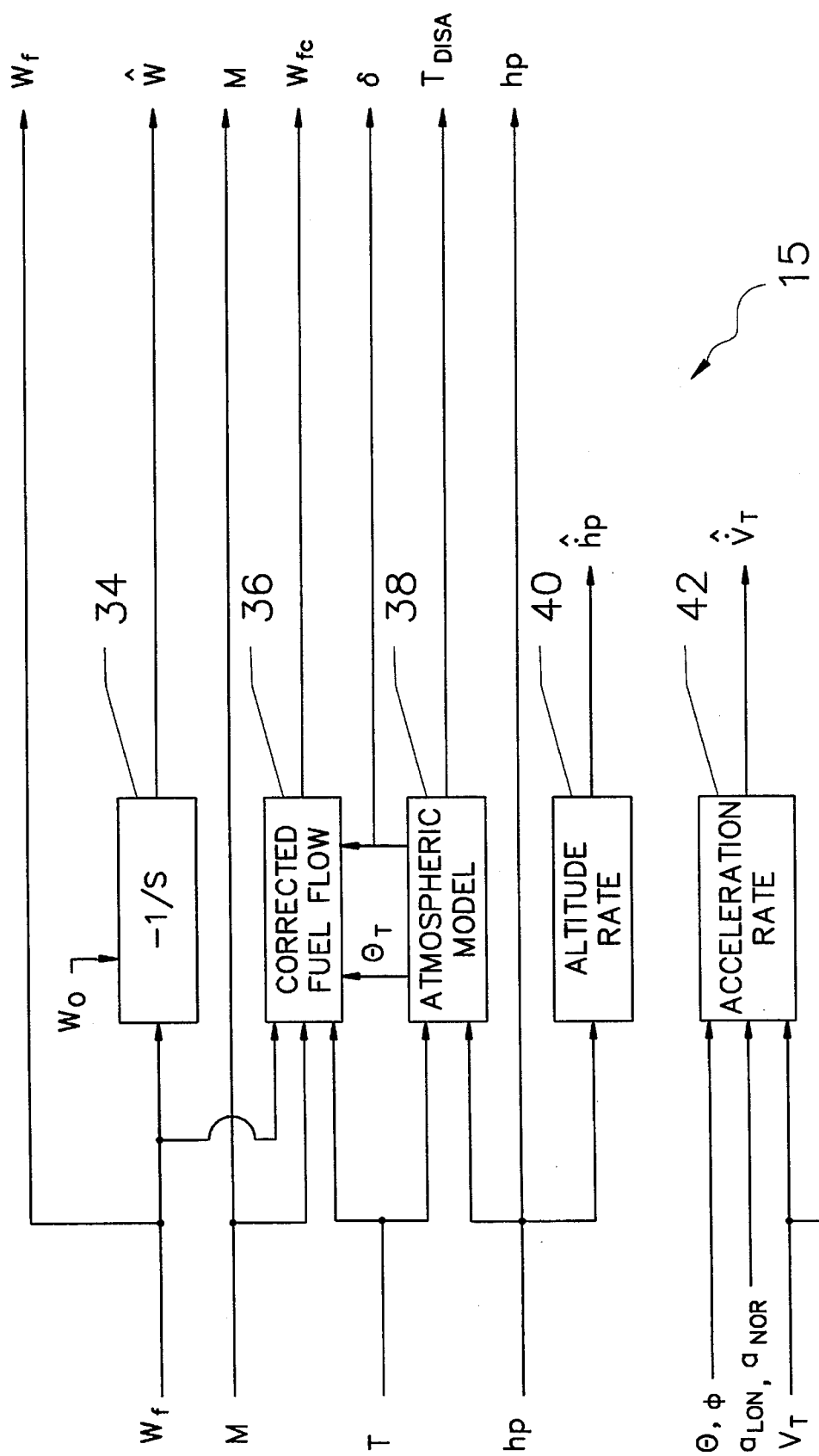
FIG. 2 shows a block diagram of the signal conditioning block of the learning portion of the method of aircraft performance estimation and prediction method of FIG. 1.
Figure 3:
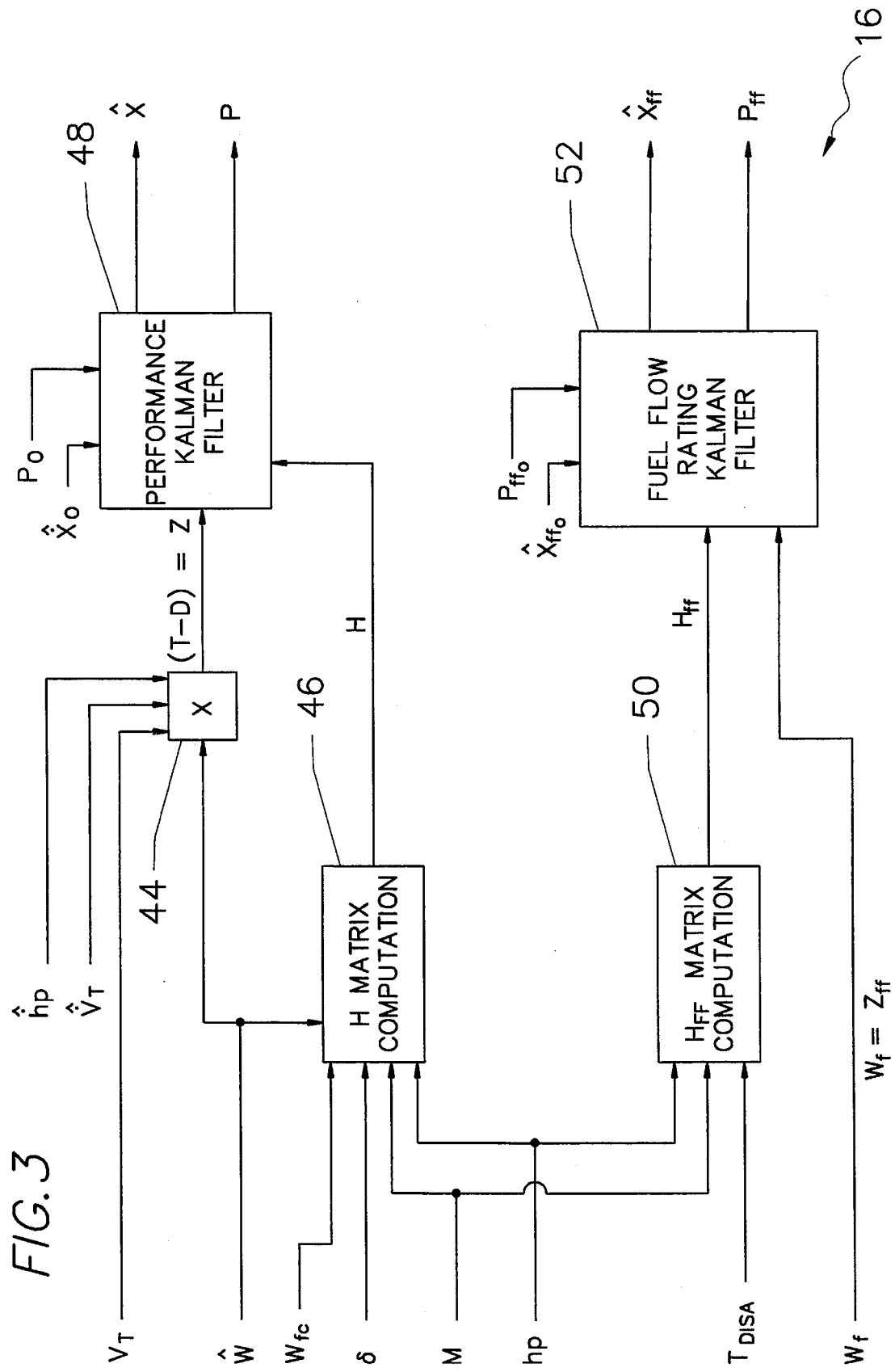
FIG. 3 shows a block diagram of the performance estimation block of the learning portion of the aircraft performance estimation and prediction method of FIG. 1.

With specific reference to FIGS. 2 and 3, the learning portion 12 of the present invention shall be described in further detail. Input signal conditioning is provided by integrator 34, corrected fuelflow block 36, atmospheric model 38 and two steady-state Kalman filters, altitude rate filter 40 and acceleration rate filter 42. Input signal conditioning block 15, FIG. 2, receives the signal parameter inputs 26 including fuelflow $W_f$, mach number M, temperature T, pressure altitude $h_p$, pitch $\theta$, roll $\phi$, sensed longitudinal acceleration $a_{LON}$, sensed normal acceleration $a_{NOR}$ and true air speed $V_T$. The inputs $W_f$, M, $V_T$, and $h_p$ are also inputs to performance estimation block 16.

Fuelflow $W_f$ is applied to integrator 34 along with initial aircraft weight $W_o$, determined from specific aircraft data including BOW and other pilot input as known to one skilled in the art, to provide an estimated weight $\hat{W}$ as fuel is utilized. Corrected fuelflow block 36 for output of corrected fuelflow $W_{fc}$ is provided with inputs of fuelflow $W_f$, mach M, and temperature T. Corrected fuelflow $W_{fc}$ is defined by:

$$W_{fc} = \frac{W_f}{\delta \sqrt{\theta}\ (1+0.2M^2)^4}$$

where $\delta$ is the pressure ratio and $\theta$ is temperature ratio. Pressure ratio $\delta$ and temperature ratio $\theta$ are provided to corrected fuelflow block 36 from atmospheric model block 38 which has the inputs of temperature T and pressure altitude $h_p$. The standard atmospheric relationships which determine these inputs to corrected fuelflow block 36 are well known and understood by those skilled in the art.

By means of integrator 34, corrected fuelflow block 36 and atmospheric model 38, conditioned inputs 28 including estimated gross weight $\hat{W}$, corrected fuelflow $W_{fc}$, pressure ratio $\delta$ and the deviation from standard temperature $T_{DISA}$ are provided to performance estimation block 16.

The altitude rate filter 40, preferably a steady state Kalman filter, provides the estimated output of altitude rate, $\hat{h}_p$. The general equation for a Kalman filter is written as $$\hat{x}_{k+1} = Kz + M\hat{x}_k$$

with z being the measurement vector, K being the gain matrix, M being a matrix derived from the gain and transition matrices, $\hat{x}_{k+1}$ being a (2,1) new state vector and $\hat{x}_k$ being the previous state vector. The only input to the altitude rate filter 40 is the pressure altitude $h_p$; z vector for the filter is of dimension (1,1). The K and M matricies are given by:

$$K = \begin{bmatrix} .5202 \\ .1868 \end{bmatrix}; M = \begin{bmatrix} .4798 & .4790 \\ -.1868 & .8102 \end{bmatrix}$$

The (2,1) new state vector $\hat{x}_{k+1}$, consists of estimates of altitude and altitude rate. The desired altitude rate output, $\hat{h}_p$ is the second element of this new state vector.

The acceleration filter 42, also preferably a steady-state Kalman filter and generalized in the same manner as altitude rate filter 40, provides a smooth estimated output rate of airspeed, $\hat{V}_T$. However, simply computing the time rate of change of $V_T$ from the airspeed input $V_T$ is insufficient. Thus, the filter also uses inertial accelerations. The acceleration in the stability reference frame is given by:

$$a_x = \cos a(a_{LON} - \sin\theta) + \sin a(-a_{NOR} + \cos\phi\cos\theta)$$

where the angle of attack a is computed from:

$$\alpha = \theta - \gamma \text{ where } \gamma = \sin^{-1}\left(\frac{\hat{h}_p}{V_T}\right)$$

with $\theta$ being pitch angle.

The measurement vector z of this filter is:

$$z = [V_T\ \alpha_x]^T$$

The K and M matricies for this filter are given by:

$$K = \begin{bmatrix} .0847 & .5915 \\ .0054 & .1797 \end{bmatrix}; \begin{bmatrix} .9153 & .3242 \\ -.0054 & .8122 \end{bmatrix}$$

The desired output of rate of airspeed, $\hat{V}_T$ is the second element of the new state vector for this filter.

As described above, the conditioned inputs 28 and several signal inputs 26 are provided to performance estimation block 16. They include gross weight estimate $\hat{W}$, corrrected fuelflow $W_{fc}$, pressure ratio $\delta$ pressure altitude $h_p$, deviation from standard temperature $T_{DISA}$, fuelflow $W_f$, altitude rate , $\hat{h}_p$, airspeed rate, $\hat{V}_T$, and true air speed $V_T$. Performance estimation block 16, FIG. 3, utilizes two Kalman filters to learn the coefficients of the Taylor series expansions modeling thrust-minus-drag and rated fuelflow as previously described. Performance Kalman filter 48 is utilized to learn the coefficients of the thrust-minus-drag relationship and fuelflow rating Kalman filter 52 is utilized to learn the coefficients of the Taylor series expansion modeling rated fuelflow. The performance Kalman filter 48 is an extended Kalman filter necessary for estimating coefficients of a non-linear function.

Kalman filtering techniques are known to those skilled in the art. This conventional approach to filtering involves propagation of a state estimate vector and a covariance matrix from stage to stage. It should be readily apparent to one skilled in the art that any appropriate filtering technique may be used in this performance estimation portion of the invention to provide the process of learning coefficients of a mathematical model. Such filtering could also be utilized where filters are used in signal conditioning block 15. Likewise, it is recognized that neural networks could be used in lieu of the series expansion modeling technique.

There are five recursive equations that make up a Kalman filter used in the present invention for filters 48,52. Preferably, they are run on a 10 second cycle as long as qualifying measurements are available. The state vector is expressed as $\hat{x}$. The covariance matrix P describes the degree of uncertainty in $\hat{x}$. The process is assumed to be subject to zero-mean, Guassian white noise described by a Q matrix which is diagonal. The measurement vector is z and its associated covariance matrix is given by R.

Since, in the cases of the performance Kalman filter 48 and the fuelflow rating Kalman filter 52, essentially steady-state coefficients are being estimated, the respective state transition matrices $\Phi$ become identity I, and the standard Kalman filter equations reduce as follows:

propagation equations:

$$\hat{x}^- = \Phi\hat{x}_k = \hat{x}_k$$

$$P^-_{k+1} = \Phi P_k \Phi^T + Q = P_k + Q$$

gain computation:

$$K_k = P_k^- H^T (H P_k^- H^T + R)^{-1} = \frac{P_k^- H^T}{H P_k^- H^T - R}$$

since R is scalar in these cases.

update equations:

$$P_k = (I - K_k H) P^- k$$

$$\hat{x}_k = \hat{x}_k^- + K_k(z_k - H\hat{x}^- k) = (I - K_k H)\hat{x}_k^- + K_k z_k$$

In accordance with the general description of Kalman filters above, the T–D state estimate vector $\hat{x}$ is of dimension (11,1) including the coefficients of the T–D Taylor series expansion as discussed previously. The state vector $\hat{x}$ is given by:

$$\hat{x} = [\hat{x}_1 \ldots \hat{x}_{11}]^T$$

Therefore, the update vector H is of dimension (1,11) and consists of the parameters of the T–D series. The update vector H is computed as shown by block 46, FIG. 3, as a function of Mach number M, pressure ratio $\delta$, weight $\hat{W}$, corrected fuelflow $W_{fc}$ and altitude $h_p$. The update vector H is provided to performance Kalman filter 48. The first seven elements of update vector H are given by the thrust update vector $H_T$ and the last four are given in the drag update vector $H_D$.

The thrust update vector $H_T$ is as follows:

$$H_T = \delta[1, \Delta M, \Delta W_{fc}, \Delta h, (\Delta M)^2, \Delta M \Delta W_{fc}, (\Delta W_{fc})^2]$$

The drag update vector $H_D$ is Mach number dependent. The incompressible $H_D$ or $H_{D_i}$ is:

$$H_{D_1} = \left[ C_1 \delta M^2, \hat{W}, \frac{\hat{W}^2}{C_1 \delta M^2}, 0 \right]$$

where $C_1$ is (1481)(S).

The compressible $H_D$ or $H_{D_c}$ is only computed when the Mach number M is above the critical Mach number $M_{c_r}$ and is given by:

$$H_{D_c} = \left[ 0, 0, 0, (\Sigma h_i x_i) 2\Gamma \frac{\xi}{\sin(2\xi)\lambda} \right]$$

where $$\xi = (M - M_{cr})^2 \left[ \left( \frac{W}{C_1 \delta M^2} \right)^3 + .1 \right]$$

and where the summation run is from i of 8 to 10. Finally, when $$M < M_{cr} \text{ then } H_D = H_{D_i}$$

and when $$M \geq M_{cr} \text{ then } H_D = H_{D_i}(1+\Gamma) + H_{D_c}$$

Because of the greatly differing ranges of the variables in update vector H, it is normalized by a matrix N. This normalized update vector H' is then used in the Kalman filter equations. This vector H' is defined as:

$$H' = HN$$

where the normalization matrix, N, is a diagonal matrix of dimension (11,11). The diagonal elements are defined as:

$$N = [3000, 2000, 0.1, 0.005, 2000, 0.1, 0.00001, 0.005, 0.005, 0.03, 25]$$

As shown by block 44, the measurement vector, z, of dimension (1,1) and representative of thrust-minus-drag T–D is computed from the gross weight estimate $\hat{W}$ and the inputs of true airspeed $V_T$, altitude rate $\dot{h}_p$ and rate of airspeed $\dot{V}_T$ as follows:

$$z = \hat{W} \left( \frac{\dot{h}_p}{V_T} f_2 + \frac{\dot{V}_T}{g} f_1 \right)$$

where g is the gravitational constant of 32.174 ft/sec², $f_1$ is a knots to ft/sec conversion factor of 1.6878065, and $f_2$ is a ft/sec to knots conversion factor of 0.5924850.

With the associated error covariance R (1,1) of measurement vector z set to a predetermined vector and the diagonal elements in Q (11,11) set to a predetermined vector, $\hat{x}'$, the normalized form of $\hat{x}$, can be computed. Not-normalized $\hat{x}$ is then computed from the Kalman filter output of $\hat{x}'$ and N as follows:

$$\hat{x} = N \hat{x}'$$

In order to take a measurement of the quantity thrust-minus-drag T–D, an estimate of current acceleration must be available. In a cruise condition of the aircraft, current acceleration is zero and a measurement is not taken unless this condition is ensured. However, in climb or descent of aircraft acceleration is not zero. In prior art systems, acceleration was estimated from a planned speed schedule; however, this schedule could be violated in actual flight. The present invention bases its acceleration estimate on currently estimated values of rate of change of true air speed, $\dot{V}_T$ and altitude rate, $\dot{h}_p$ utilizing inertial acceleration components. Also, measurements are processed only when estimated acceleration is within acceptable limits. The following conditions determine when the thrust-minus-drag equation is valid and consequently when to run the Kalman filter for the learning process:

The airplane must be 5,000 ft above the takeoff runway.

The bank angle must be less than 5 degrees.

The rate of change in pitch must be less than 0.1 degree per second.

The Mach number must be greater than 0.40.

After $\hat{x}$ has been learned, the coefficients thereof can be used in the prediction portion 14 of performance estimation and prediction method 10 in subsequent aircraft flights.

The Kalman filtering approach propagates the covariance matrix rather than information which is the inverse of the covariance matrix. This leads to a much more computationally efficient form of filter. With use of normalization and double-precision arithmetic more maintainable software is achieved without compromise of accuracy.

Although the individual terms of the mathematical model can be separated as to which apply to thrust and which apply to drag, the estimate of the combined relationship of thrust-minus-drag (T–D) is more accurate than individual estimates of thrust and drag as they are not independent. Greater accuracy can be achieved in prediction of characteristics by expressing most of the computations required for prediction in a form that does not depend on such separation.

With regard to fuelflow estimation, the fuelflow rating Kalman filter 52 is run when the following filter conditions are satisfied. The core filter equations for the filter 52 have already been discussed with regard to performance Kalman filter 48. The conditions include:

The aircraft must be more than 1,500 ft above the takeoff runway.

The aircraft vertical speed must be greater than a minimum vertical speed $V_{min}$ defined as (units of ft/min):

$$V_{min} = 2,000 - 1,900 \frac{h_p}{h_{cgil}}$$

The aircraft must be controlling to airspeed while climbing and at the same time be 1,000 ft below any preselected level off altitudes.

The fuelflow must not have changed more than 400 lbs/hour since the last 10 second sample of the filter. If it has, a 30 second timer is started before learning is again enabled.

The fuelflow state estimate vector $\hat{x}_{ff}$ is of dimension (5,1) and is defined in accordance with the partial derivatives of the Taylor series expansion modeling fuelflow. The state vector $\hat{x}_{ff}$ is given the subscript ff to distinguish it from the thrust-minus-drag state estimate vector and is given by:

$$\hat{x}_{ff} = [\hat{x}_{ff1} \ldots \hat{x}_{ff5}]$$

The update vector $H_{ff}$ is computed as a function of Mach number M, pressure altitude $h_p$ and deviation from standard temperature $T_{DISA}$ as shown by $H_{ff}$ matrix computation block 50. Update vector $H_{ff}$ is of dimension (1,5) and is defined by:

$$H_{ff} = [1, \Delta M, \Delta h_p, T_{DISA}, T_{DISA}\Delta h_p]$$

Because of the greatly differing ranges of the variables in $H_{ff}$, it is normalized by matrix $N_{ff}$ resulting in normalized $H'_{ff}$ which is used in the Kalman filter techniques and is given as follows:

$$H'_{ff} = H_{ff} N_{ff}$$

where $N_{ff}$ is a diagonal matrix of dimension (5,5); the diagonal elements thereof given by:

$$N_{ff} = [1000, 300, 0.05, 10, 0.005]$$

The measurement vector $z_{ff}$ (1,1) is the current unfiltered and uncorrected fuelflow $W_f$. With the associated error covariance $R_{ff}$ of $z_{ff}$ set to a predetermined vector and the diagonal elements in $Q_{ff}$ (5,5) set to predetermined values, $\hat{x}'_{ff}$, the normalized vector can be computed. Not-normalized $\hat{x}_{ff}$ is then computed from the Kalman filter output of $\hat{x}'_{ff}$ and $N_{ff}$ as follows:

$$\hat{x}_{ff} = N_{ff}\hat{x}'_{ff}$$

The vector $\hat{x}_{ff}$ can then be utilized by predicting portion 14 of aircraft performance estimation and prediction method 10.

With rated climb fuelflow $W_{fr}$ being modeled as a function of Mach number M, altitude $h_p$ and deviation from standard temperature at altitude $T_{DISA}$, significantly improved estimates of fuel consumed during climb are achieved. In addition, the results of this estimation are employed to predict characteristics such as maximum cruise speed.

The state estimate vectors $\hat{x}_{ff}$ and $\hat{x}$ and the covariance matrices $P_{ff}$ and P are part of the aircraft data file and stored in non-volatile memory 32. Each time a transition from airborne true to false is detected, an aircraft flight counter is incremented and the file updated with the latest values for such matrices. Only if a new aircraft data file is loaded is the data replaced; the learned data from one aircraft being capable of usage for seeding other aircraft. The initial values of $\hat{x}_{ffo}$ for the first flight in a new aircraft type are set to:

$$\hat{x}_{ffo} = [400, 1000, -0.15, -25, 0.01]$$

The initial values of $\hat{x}_o$ for the first flight on a new aircraft type are set to:

$$\hat{x}_o = [12000, 0, 2, 0, 6000, 1, 0, 0.02, -0.01, 0.1, 150],$$

and the $P_o$ and $P_{ffo}$ matrices are set to identity matrices.

Data from a first application of the method on a new aircraft type creates a data file to be used as a starting file or seeding file on other aircraft of the same type. The $\hat{x}_{ffo}$ matrix, the $\hat{x}_o$ matrix, and the diagonal elements of $P_o$ and $P_{ffo}$ will remain unchanged; however, all non-diagonal elements in the $P_o$ and $P_{ffo}$ matrices are set to 0.

With a computer containing the present invention including an aircraft data file that is sufficiently learned, various predictions can now be accomplished via the predicting portion 14 of the performance estimation and prediction method 10. Such various predictions are made with regard to climb, cruise, and descent and as a function of modeled thrust-minus-drag and/or modeled rated-fuelflow.

Figure 15:
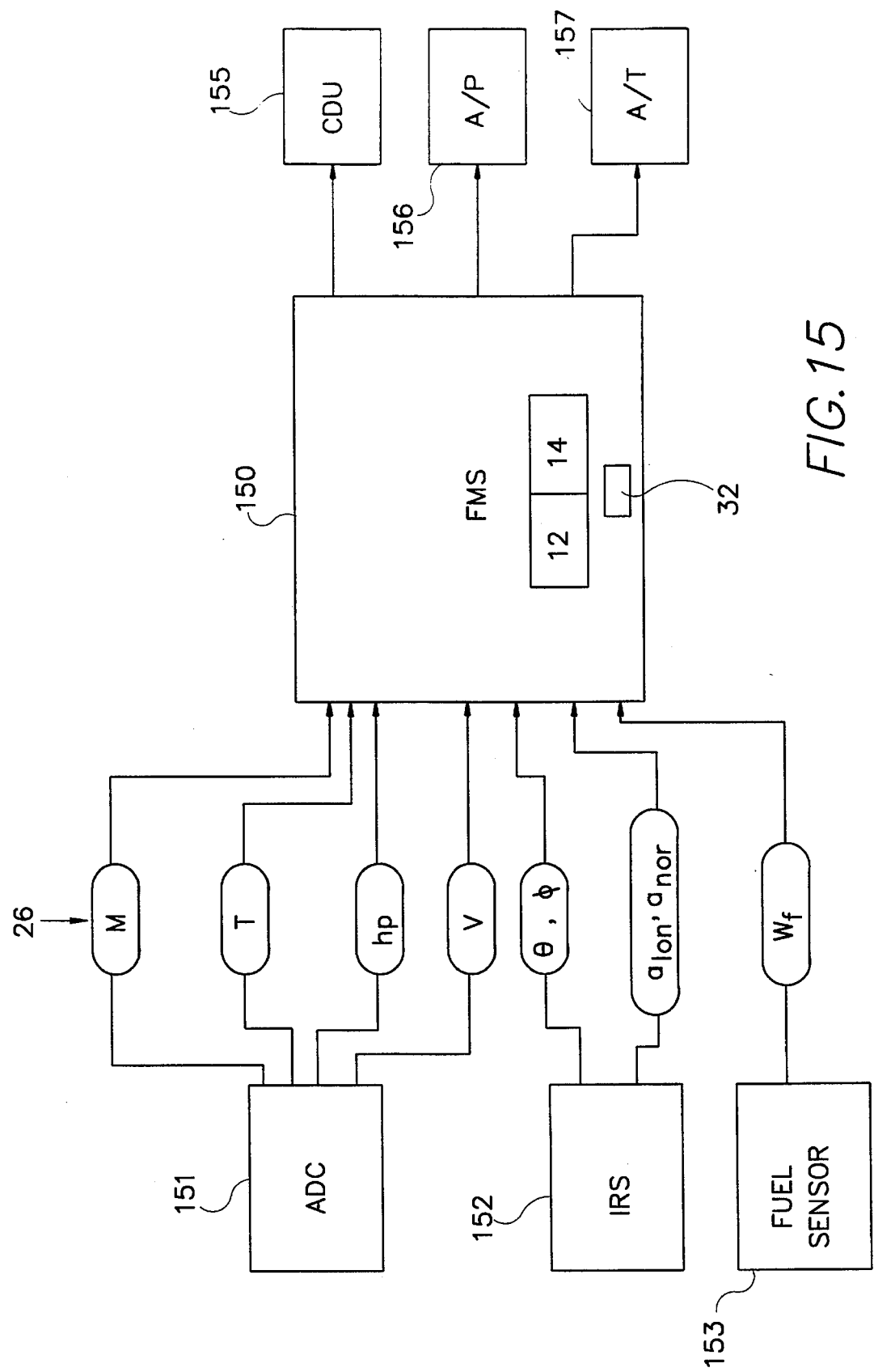
FIG. 15 illustrates the invention embodied in a flight management system in communication with various aircraft sensing, control, and display systems.

FIG. 15 illustrates the invention embodied in a flight management system(FMS) in communication with various aircraft sensing, control, and display systems. In the preferred embodiment, learning portion 12 and predicting portion 14 are implemented in software running on a computer as an integral part of FMS 150. Non-volatile memory 32 is also a part of FMS 150. FMS 150 is in communication with various aircraft systems which supply input parameters 26 to learning portion 12 and predicting portion 14. Air data computer(ADC) 151 supplies mach(M), temperature(T), altitude(hp), and true airspeed($V_T$) data. Inertial reference system(IRS) 152 supplies pitch($\theta$), roll($\phi$), longitudinal acceleration ($a_{LON}$), and normal acceleration ($a_{NOR}$) data. Fuel sensor 153 supplies fuel flow (Wf) data. Each of these aircraft systems, and their equivalents, are well known in the art and need not be further described.

In one embodiment, performance predictions 154 are communicated to a control display unit(CDU) 155. The aircraft pilot or operator uses the displayed performance predictions to control the aircraft to the optimal flight profile. It is envisioned that any type of display device may be used to communicate performance predictions to the pilot including, but not limited to, cathode ray tubes, flat panel displays, heads up displays(HUDs) and the like. In alternate embodiments, performance predictions are communicated to an autopilot(A/P) 156 and an autothrottle(A/T) 157 which automatically control the aircraft to the optimal flight profile. Those skilled in the art understand that performance predictions would normally be transformed into a suitable format prior to communicating performance predictions 154 to CDU 155, A/P 156, or A/T 157.

Figure 4:
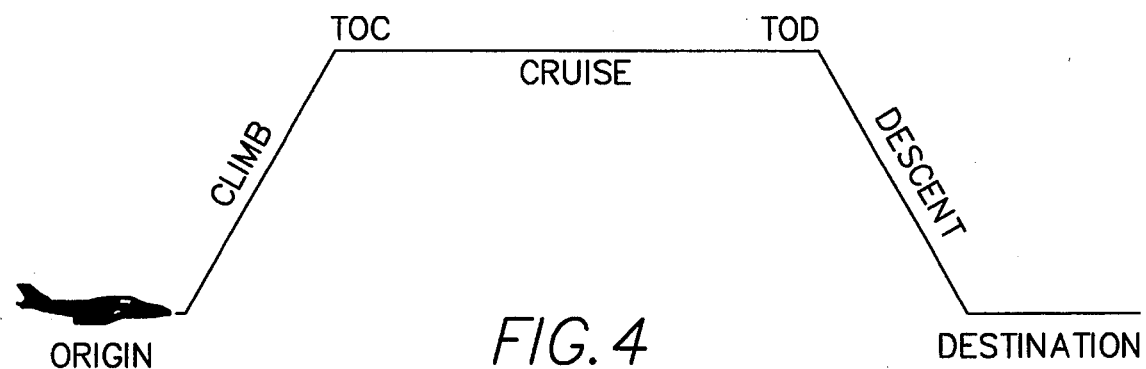
FIG. 4 is a chart showing an aircraft flight.

An aircraft flight is divided into three phases: climb phase, cruise phase and descent phase, FIG. 4. The climb phase occurs from the origin of the flight to top of climb (TOC). The cruise phase extends from TOC to top of descent (TOD). Finally, the descent phase begins at TOD and continues through destination. Predictions for these phases of the flight are made via the method blocks: climb prediction 18, cruise predictions 20 and descent predictions 22.

Figure 5A:
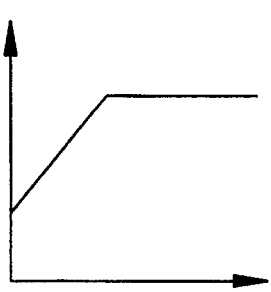
FIGS. 5A–5C are graphs showing variations in key parameters as a function of altitude.
Figure 5B:
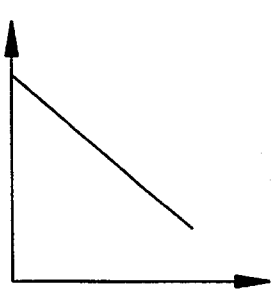
Figure 5C:
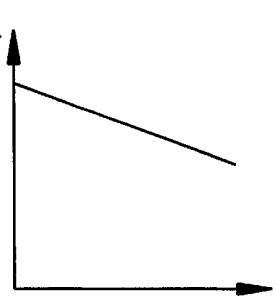

Climb predictions 18 provide the following information: time enroute, t, fuel remaining $F_r$, altitude $h_p$, airspeed $V_T$, and groundspeed $V_G$ at each waypoint in a flightplan. Also, the top of climb predictions including the distance-to $X_{TOC}$ and fuel remaining at top of climb $F_{TOC}$ are determined. The prediction methods involve extensive use of first order Taylor Series expansions. The quantities climb angle $\gamma$, rated fuelflow $W_{fr}$, and true airspeed $V_T$, are all assumed to vary linearly with altitude as shown in FIGS. 5A–5C. They are written as:

$$\gamma = \Delta_o + \frac{d\gamma}{dh_p} \bigg|_o (h_p - h_{p_o})$$

$$W_{fr} = W_{fr_o} + \frac{dW_{fr}}{dh_p} \bigg|_o (h_p - h_{p_o})$$

$$V_T = V_{T_o} + \frac{dV_T}{dh_p} \bigg|_o (h_p - h_{p_o})$$

where $$\gamma = \gamma_{air} \frac{V_T}{V_G} \text{ and } \gamma_{air} = \frac{T - D}{W(1 + ACF)}$$

where ACF is a standard acceleration factor known to those skilled in the art, W is the aircraft gross weight, $V_G$ is groundspeed, and subscript $_o$ means the quantity evaluated at a reference altitude.

The climb angle $\gamma$ is referenced to earth fixed coordinates and is therefore corrected for the effect of winds. The rate of change of $\gamma_{air}$ with respect to altitude $h_p$ is written:

$$\frac{d\gamma_{air}}{dh_p} = \gamma_{air} \left[ \frac{\frac{d(T-D)}{dh_p}}{(T-D)} - \frac{\frac{dW}{dh_p}}{W} - \frac{\frac{dACF}{dh_p}}{(1+ACF)} \right]$$

By assuming that the wind increases with altitude, the rate of change of climb angle $\gamma$ with altitude $h_p$ is also corrected for the effects of wind by:

$$\frac{d\gamma}{dh_p} = \gamma_{air} \frac{d}{dh_p} \left( \frac{V_T}{V_G} \right) + \frac{V_T}{V_G} \frac{d\gamma_{air}}{dh_p}$$

The rate of change of rated fuelflow with respect to altitude $$\frac{dW_{fr}}{dh_p}$$

is readily available from the rated fuelflow $W_{fr}$ equation previously discussed. Similarly, the rate of change of thrust-minus-drag with respect to altitude $$\frac{d(T-D)}{dh_p}$$

is available from the thrust-minus-drag T–D equation previously discussed. The rate of change of true airspeed with altitude $$\frac{dV_T}{dh_p}$$

can be found by assuming either a constant calibrated airspeed or a constant mach number and either a constant lapse rate or a constant temperature.

Distance x, time t, and fuelburn, F, are now written as integrals with respect to altitude $h_p$ in forms which allow the solutions to be found using standard integral tables. The integrals are expressed as:

$$x = \int \frac{1}{\gamma} dh_p$$

$$t = \int \frac{1}{V_T \gamma_{air}} dh_p$$

$$F = \int \frac{W_{fr}}{V_T \gamma_{air}} dh_p$$

The climb integration is typically subdivided into three steps. These steps are: a lower step where it is assumed that the aircraft flies at a constant calibrated airspeed, a middle step where the aircraft flies at a constant Mach number but is below the tropopause, and finally an upper step where the aircraft is flying at a constant Mach number but is above the tropopause. The step altitudes are determined by a specific aircraft's climb KCAS/Mach defined in the aircraft data file or entered by the pilot. For the $$\frac{dV_T}{dh_p} = 0$$

and for the two other steps, $$\frac{dV_T}{dh_p}$$

can be determined assuming a standard lapse rate. The cruise altitude chosen, either an optimum altitude or a pilot entered altitude, may be set low enough to preclude one or more of these steps. The starting altitude for climb predictions is always the aircraft altitude. Thus, as the aircraft climbs, the number of climb steps are reduced. Once in cruise, no climb predictions are made. The reference altitude for each step, where the various quantities are evaluated, is always chosen to be the step's mid-altitude.

Distance x as a function of altitude $h_p$ which is used for TOC placement, becomes:

$$x = \frac{1}{\frac{d\gamma}{dh_p} \bigg|_o} \ln \left[ \frac{h_e - h_{gg}}{h_b - h_{gg}} \right]$$

where $h_e$ is the altitude at the end of the step, $h_b$ is the altitude at the beginning of the step, and $$h_{gg} = h_o - \frac{\gamma_o}{\frac{d\gamma}{dh_p} \bigg|_o}$$

By rewriting this equation, altitude $h_p$ as a function of distance x, can be found for use in making altitude predictions at waypoints, or in this case at the end of a step.

$$h_e = h_{gg} + (h_b - h_{gg}) \exp \left( \frac{d\gamma}{dh_p} \bigg|_o x \right)$$

The solutions to time t and fuelburn F are subdivided into two parts, one when $V_T$ is constant and second when $V_T$ is changing with altitude $h_p$. For constant $V_T$:

$$t = \frac{1}{V_{T_o} \frac{d\gamma_{air}}{dh_p}\bigg|_o} \ln\left[\frac{h_e - h_{ga}}{h_b - h_{ga}}\right]$$

and $$F = \frac{\frac{dW_{fr}}{dh_p}\bigg|_o}{V_{T_o}\frac{d\gamma}{dh_p}\bigg|_o}\left[(h_e - h_b) + (h_{ga} - h_w)\ln\left[\frac{h_e - h_{ga}}{h_b - h_{ga}}\right]\right]$$

For $dV_T/dh_p \neq 0$ $$t = \left[\frac{1}{\frac{dV_T}{dh_p}\bigg|_o \frac{d\gamma_{air}}{dh_p}\bigg|_o}\right]\left[\frac{1}{(h_{V_T} - h_{ga})}\right]\ln\left[\frac{(h_e - h_{V_T})\,h_b - h_{V_T}}{(h_e - h_{ga})(h_e - h_{(V_T)})}\right]$$

$$F = \frac{\frac{dW_{fr}}{dh_p}\bigg|_o}{\frac{dV_T}{dh_p}\bigg|_o \frac{d\gamma_{air}}{dh_p}\bigg|_o}\left[\frac{(h_{wf} - h_{V_T})}{(h_{ga} - h_{V_T})}\ln\left[\frac{(h_e - h_{V_T})}{(h_b - h_{V_T})}\right] + \frac{(h_{wf} - h_{ga})}{(h_{V_T} - h_{ga})}\ln\left[\frac{(h_e - h_{ga})}{(h_b - h_{ga})}\right]\right]$$

where, $$h_{ga} = h_o - \frac{\gamma_{air_o}}{\frac{d\gamma_{air}}{dh_p}\bigg|_o}$$

$$h_{V_T} = h_o - \frac{V_{T_o}}{\frac{dV_T}{dh_p}\bigg|_o}$$

$$h_{wf} = h_o - \frac{dW_{f_r}}{dh_p}\bigg|_o$$

With fuelburn F, time t, and distance determined for each step, values at top of climb such as $x_{TOC}$ and $F_{TOC}$ are simply the sum of all the individual steps.

Cruise predictions 20 provide estimates of time enroute $t_{TOD}$ and fuel remaining at TOD $F_{TOD}$ and distance to TOD $x_{TOD}$. The description provided below for cruise predictions of total cruise fuelburn F and time t is described with respect to a single leg flight plan; however, it is equally applicable to a multiple leg flight plan in which case predictions are provided at each waypoint in cruise. In cruise, the altitude $h_p$ remains constant, but the aircraft's gross weight W might change significantly depending upon the length of the flight plan. Required fuelflow $W_f$ decreases correspondingly as weight W decreases. In addition, the groundspeed $V_G$ can be influenced significantly by the winds, and to a much lesser extent by temperature changes. Furthermore, when flying either at the maximum speed $M_{max}$ or at the long range cruise speed $M_{LRC}$, the mach number M (or the calibrated airspeed) will change with weight W. Like the climb prediction method, it is assumed that fuelflow $W_f$, airspeed $V_T$, and winds vary linearly. This allows for use of first order Taylor series expansions, which again produce integrals that can be solved using standard techniques.

First, fuelflow $W_f$ is known as a function of weight W from the thrust-minus-drag T–D equation by setting T–D equal to zero. The rate of change of fuelflow with respect to weight $$\frac{dW_f}{dW}$$

can then also be found using standard methods for computing derivatives. Thus, fuelflow $W_f$ can be written as:

$$W_f = W_{f_o} + \frac{dW_f}{dw}\bigg|_o (W - W_o)$$

where $W_{fo}$=initial fuelflow at TOC and $W_o$=initial gross weight at TOC from climb predictions block 18.

Cruise time as a function of weight can be written as the following integral:

$$t = \int \frac{-1}{W_f}\, dW$$

This integral can be solved to yield time as a function of weight, but the useful form is weight or fuelburn as a function of time. Casting the equation in the form of fuelburn F as a function of time t, yields $$F = \frac{W_{f_o}}{\frac{dW_f}{dW}\bigg|_o}\,(1 - e^{-t\frac{dW_f}{dW}\big|_o})$$

Distance traveled x as a function of time is given by the following integral:

$$x = \int V_G\, dt$$

where $V_G = V_T \cos(\lambda) - W_H$ with $\lambda$=drift angle and $W_H$ is the average component of the wind along the ground track.

$V_T$ is related to the Mach number M, assuming that the Mach number M changes linearly with time as follows:

$$V_T = a\left[M_o + \frac{dM}{dt}\bigg|_o t\right]$$

where "a" is the speed of sound at the cruise altitude and for an average cruise leg temperature. An expression for the average drift angle is found by integrating over the crosswind, assuming again a linear change as expressed by:

$$\cos(\lambda) = \frac{\left[\sin\left(\frac{W_{c_e}}{V_{T_o}}\right) - \sin\left(\frac{W_{c_b}}{V_{T_o}}\right)\right] V_{T_o}}{W_{c_e} - W_{c_b}}$$

where $W_C$ is the component of wind normal to the ground track with $W_{C_b}$=beginning $W_C$ and $W_{C_e}$ ending $W_C$.

Time then becomes the solution of a second order equation:

$$x = a\cos(\lambda)\left[M_o t + \frac{1}{2}\left.\frac{dM}{dt}\right|_o t^2\right] - W_H t$$

Mach number M changes with time depending upon both temperature and wind at the beginning and the end of a cruise leg. The method employed to determine $$\frac{dM}{dt}$$

is as follows. A first estimate of cruise time, assuming $$\frac{dM}{dt}$$

is zero, is used to find time t. This allows computation of fuelburn F, and predicted Weight W, at the end of the leg or as in our case the end of the cruise phase. Then, the Mach number M at the end of the leg is computed at the first estimate of W.

$$\frac{dM}{dt}$$

can then be evaluated. If a constant Mach number cruise mode is chosen, as discussed later herein, this step is not necessary. With $$\frac{dM}{dt}$$

computed, the time t and fuel estimates are then refined.

The effect of a changing wind $W_H$ can be significant because the aircraft will spend more time in the headwind than it will in the tailwind. The above estimates of time were determined using an average $W_H$. When the wind changes significantly, a slowdown factor $f_s$ can be estimated by:

$$f_s = -\ln\left[\left(1 - \frac{x\frac{dW_H}{dx}}{V_G}\right) \bigg/ \left(\frac{dW_H}{dx} t\right)\right]$$

The original time estimate can now be multiplied by the slowdown factor $f_s$ to give the final time and fuelburn values.

Descent predictions 22 are performed in a similar manner to the climb predictions 18. For descent predictions block 22, which utilizes $\hat{x}$, the inputs of a descent schedule, winds, and estimated cruise altitude $\hat{h}_{P_{crz}}$, two basic modes can be utilized. The first mode is called a path descent method where the ground referenced descent angle $\gamma_d$ is constant. This method fixes the TOD placement regardless of winds predicted. The other method fixes the descent angle $\gamma_d$ and consequently moves TOD based on predicted winds.

Figure 6:
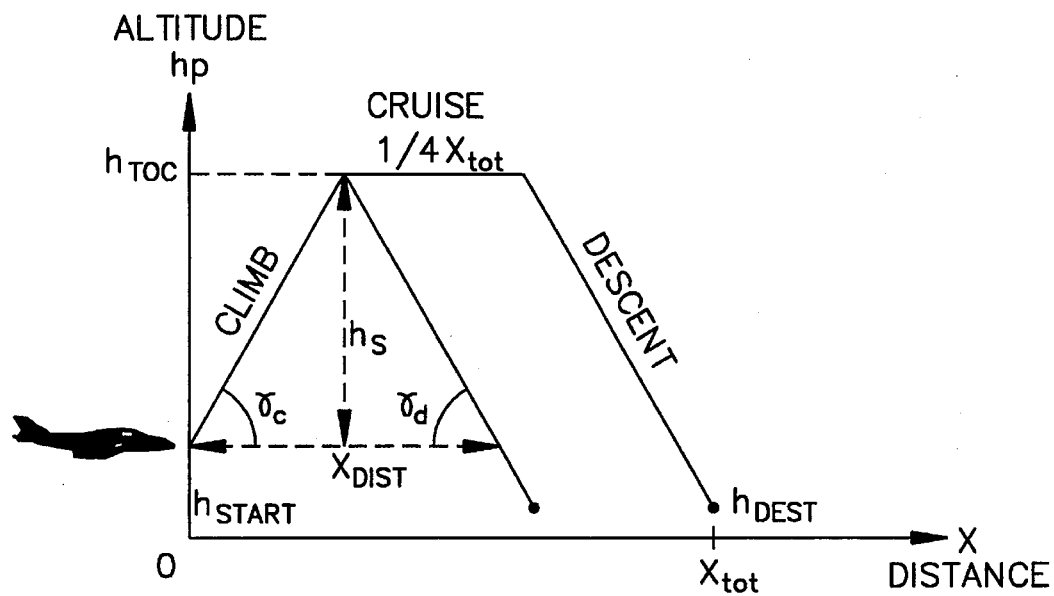
FIG. 6 is a graph showing short trip limited altitude.

For short flight plans, the optimum altitude $h_p$ may be limited by how high the aircraft can go before a descent is necessary. The following rule described with reference to FIG. 6, is employed: the cruise phase should be at least 30 nautical miles, but no more than one quarter of the total flight plan distance ¼$x_{tot}$. A corrected distance $x_{dist}$ can be constructed accounting for the origin and destination elevation and subtracting the cruise distance. The short trip limited altitude, $h_s$, can then be estimated. It is assumed that the descent angle $\gamma d$ is constant and that the climb angle $\gamma_c$ decreases linearly with altitude. Using the standard Sine Rule with a small angle approximation and the first order Taylor series expansion for the climb angle $\gamma_c$ leads to the following second order equation for $h_s$:

$$h_s^2 \frac{d\alpha_c}{dh_p}\bigg|_o + h_s\left(\gamma_{c_o} + \gamma_d - x_{dist}\frac{d\gamma_c}{dh_p}\bigg|_o \gamma_d\right) - x_{dist}\gamma_c\gamma_d = 0$$

This equation can then be solved to yield $h_s$ which provides the short trip limited optimum cruise altitude.

Figure 7A:
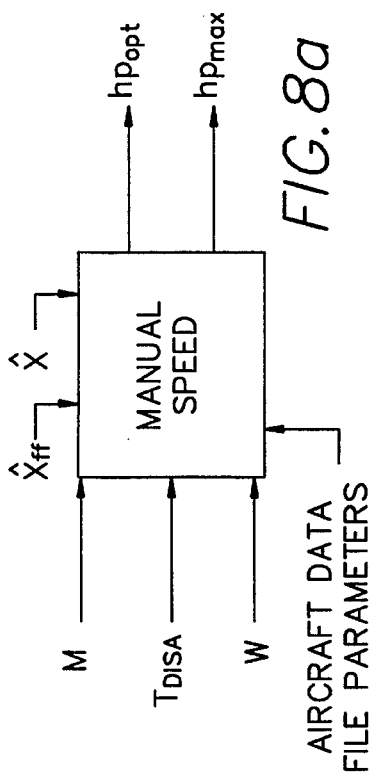
FIGS. 7A–7C, show method blocks for determining speed in accordance with the present invention when altitude is fixed.
Figure 7B:
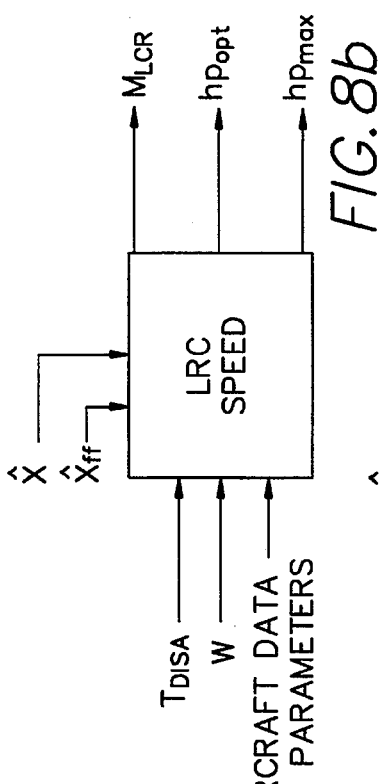
Figure 7C:
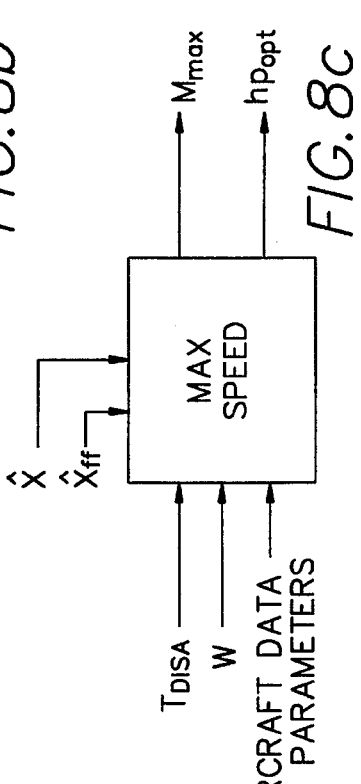

Along with the predictions of fuelburn, time, and other performance characteristics such as climb angle, predictions for speed and/or altitude in various speed modes of cruise predictions block 20 as shown in FIGS. 7A–7C and FIGS. 8A–8C are performed utilizing Newton's method related techniques. Newton's method related techniques allow for determining certain points of interest on curves that represent functions to be maximized or otherwise localized given particular constraints. This leads to the ability to compute speed in various speed modes as shown in FIG. 7A–7C with altitude fixed. They include long range cruise speed, FIG. 7A; maximum speed, FIG. 7B; and maximum endurance speed, FIG. 7C. It also leads to the ability to compute altitude with speed fixed as in manual speed at optimal altitude, FIG. 8A. In addition, in higher dimension cases, Newton's method related techniques are used to find certain points of interest on surfaces that represent functions to be maximized, such as where speed and altitude are variable. Such modes include long range cruise speed at optimal altitude, FIG. 8B, and maximum speed at optimum altitude, FIG. 8C. In the case of long range cruise, speed and altitude are determined for providing best fuel mileage, or in other words, the speed which maximizes specific range $S_R$ is determined; specific range being defined as:

$$S_R = \frac{V_G}{W_f}$$

wherein $V_G$ is ground speed and $W_f$ is fuelflow.

Figure 9:
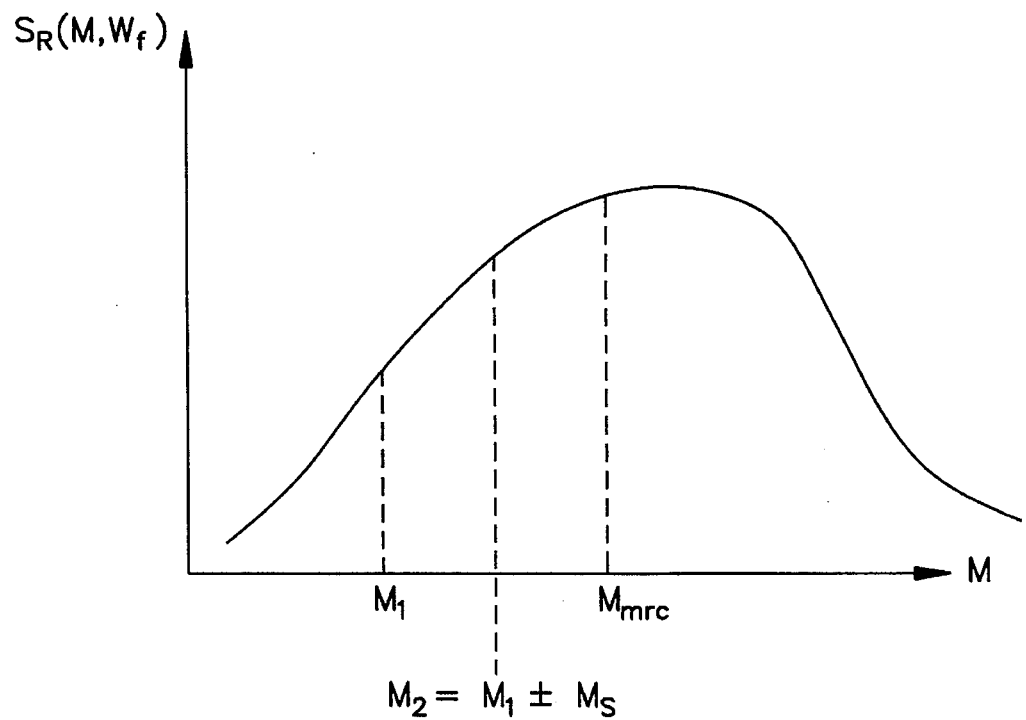
FIG. 9 is a graph showing a specific range as a function of speed.

With mach M being determined as a function of fuelflow $W_f$ while altitude and weight are fixed, and T–D is taken to be zero or some small positive constant, Newton's method related techniques shall be described for calculation of long range cruise speed $M_{LRC}$, FIG. 7A. To describe calculation of long range cruise speed, a curve, FIG. 9, is shown wherein the x-axis is mach number M and the y-axis is specific range $S_R$ which is a function of mach number M and fuelflow $W_f$. Maximum range cruise mach $M_{mrc}$ is the mach number for which $S_R(M)$ is a maximum. Long range cruise Mach $M_{LRC}$ is the point above $M_{mrc}$ at which $S_R(M)=0.99S_R(M_{mrc})$. $M_{mrc}$ is determined in accordance with the following steps with altitude $h_p$ and weight W being given parameters:

a) Choose an initial estimate, $M_1$:

$$M_1 = 1.565\sqrt{\frac{W}{C_1\delta}}$$

where $C_1=1481(S)$, W is gross weight and $\delta$ is atmospheric pressure ratio.

b) Compute the specific range $S_R$ and the derivative of specific range $S_R'$ with respect to mach at this point:

$$S_{R_1} = S_R(M_1)\quad S_{R_1}' = \frac{dS_R}{dM}\bigg|_{M_1}$$

The details of this computation are described further below.

c) Choose a second initial estimate, $M_2$:

$$M_2 = \begin{cases} M_1 + M_s \text{ if } S_{R_1}' < 0 \\ M_1 - M_s \text{ if } S_{R_1}' \geq 0 \end{cases}$$

where $M_s$=mach step size=0.05 initially d) Compute $S_{R_2}$, and $S_{R_2}'$ in the manner like explained below for $S_{R_1}$ and $S_{R_1}'$.

e) Estimate the second derivative $S_R''$:

$$S_R'' = \frac{S_{R_2}' - S_{R_1}'}{M_2 - M_1}$$

f) Check if the second derivative is non-negative. If non-negative, the current "best fit" parabola has a minimum so no maximum will be found. This implies that the real $S_R$ function has an inflection point and the search region must be moved past the inflection point which is also away from the current minimum:

$$M_{mrc} = \begin{cases} M_1 - M_{1A}, S_{R_1}' < 0 \\ M_1 - M_{1A}, S_{R_1}' \geq 0 \end{cases}$$

where $M_{IA}$=mach "inflection adjustment"=0.2

If the second derivative is negative, the current best-fit parabola has a maximum which is "close" to the real $M_{mrc}$. This maximum is the point at which $S_R(M)=0$:

$$M_{mrc} = \frac{M_1 S_{R_2}' - M_2 S_{R_1}'}{S_{R_2}' - S_{R_1}'}$$

Ensure that this new value for $M_{mrc}$ is not farther than $M_{IA}$ from $M_1$. If so, set $M_{mrc}=M_1 \pm M_{IA}$ whichever limits the movement of $M_{mrc}$ without changing its direction.

g) Reduce the mach step size $M_s=M_s/2$.

h) If the absolute value of $M_{mrc}-M_1>0.003$, revise the initial estimate: $M_1=M_{mrc}$ and repeat steps b)-g), otherwise go to step i).

i) Compute $S_{R_{mrc}}=S_R(M_{mrc})$ and $S_{R_{mrc}}'=S_R'(M_{mrc})$.

j) Estimate the second derivative at this final maximum:

$$S_R'' = \frac{S_{R_{mrc}}' - S_{R_1}'}{M_{mrc} - M_1}$$

k) Compute the long range cruise speed:

$$M_{LRC} = M_{mrc} + \sqrt{.02 + S_{R_{mrc}}/S_R''}$$

The computation of specific range $S_R$ as for a given value of mach M, and of the first derivative, $$S_R'(M) = \frac{dS_R}{dM}(M),$$

step b) above, given specific values of pressure altitude $h_p$, temperature deviation $T_{DISA}$, weight W and current coefficients $\hat{x}$ are as follows:

a) Compute $\Delta M = M - M_o$ and $\Delta h_p = h_p - h_{po}$ where $M_o$=0.6 and $h_{po}$=30,000 ft b) Compute temperature ratio $\theta$ and pressure ratio $\delta$ from $h_p$ and $T_{DISA}$ by standard atmospheric relationships.

c) Compute true airspeed $V_T$:

$$V_T = a_o \sqrt{\theta} \, M$$

where $a_o$ is the standard sea-level speed of sound=661.4748 kts.

d) If $M>M_{cr}$, perform steps e)-g) to compute $\Gamma$, $$\frac{d\Gamma}{d\delta}, \text{ and } \frac{d\Gamma}{dM},$$

otherwise set $$\Gamma = \frac{d\Gamma}{d\delta} = \frac{d\Gamma}{dM} = 0$$

and continue with step h).

e) Compute coefficient of lift $C_L$:

$$C_L = \frac{W}{C_1 \delta M^2}$$

where $C_1=1481(S)$ f) Compute two interim terms, $\zeta$ and $\xi$:

$$\zeta = 15(M-M_{cr})^2; \; \xi = (M-M_{cr})^2 (C_L^3 + 0.1)$$

g) Compute $\Gamma$, $$\frac{d\Gamma}{d\delta}, \text{ and } \frac{d\Gamma}{dM}$$

$$\Gamma = \zeta \tan(\xi \hat{x}_{11})$$

$$\frac{d\Gamma}{d\delta} = \frac{-6\Gamma \xi \hat{x}_{11} C_L^3}{(C_L^3 + .1)\delta \sin(2\xi \hat{x}_{11})}$$

$$\frac{d\Gamma}{dM} = \frac{2\Gamma}{M - M_{cr}} \left[ 1 + \frac{2\xi \hat{x}_{11}}{\sin(2\xi \hat{x}_{11})} + \frac{2\delta}{M} \frac{d\Gamma}{d\delta} \right]$$

h) Thrust-minus-drag T–D as a function of corrected fuelflow $W_{fc}$ is written as a quadratic in $\Delta W_{fc}$:

$$T-D = a\Delta W_{fc}^2 + b\Delta W_{fc} + c = T_{rc}$$

where $T_{rc}$ is residual climb thrust and is given by:

$$T_{rc} = \frac{W \dot{h}_{rc}}{V_T}$$

where $\dot{h}_{rc}$ is taken (in this case) to be 100 fpm and the quadratic coefficients are computed as:

$a = \delta \hat{x}_7$ $b = \delta(\hat{x}_3 + \hat{x}_6 \Delta M)$ $c = T_{rc} + \delta(\hat{x}_1 \hat{x}_2 \Delta M + \hat{x}_4 \Delta h_p \hat{x}_5 \Delta M^2) - h_D$ where $$h_D = \left( \hat{x}_8 c_1 \delta M^2 + \hat{x}_9 W + \hat{x}_{10} \frac{W^2}{c_1 \delta M^2} \right)(1+\Gamma)$$

i) Find the solution to the quadratic:

$$q = \sqrt{b^2 - 4ac}$$

$$\Delta W_{f_c} = \frac{-b+q}{2a}$$

if $|a|>\epsilon$, otherwise $\Delta W_{fc}=-c/b$ where $\epsilon$ is a small positive constant.

j) Find fuelflow for this mach number:

$$W_{fc} = \Delta W_{fc} + W_{fc_o},$$

where $W_{fc_o} = 7400$ lbs/hr.

$$W_f = W_{fc} \delta \sqrt{\theta} \, (1 + .2M^2)^4$$

k) Find groundspeed $V_G$ and specific range $S_R$:

$$V_G = V_T - W_H$$

where $H_H$=headwind $$S_R = \frac{V_G}{W_f}$$

l) Compute the partial derivatives of fuelflow with respect to mach and to corrected fuelflow:

$$\frac{\partial W_f}{\partial M} = \frac{1.6 M W_f}{1 + .2M^2}$$

$$\frac{\partial W_f}{\partial W_{fc}} = \frac{W_f}{W_{fc}}$$

m) Compute the total derivative of corrected fuelflow with respect to mach:

$$\frac{dc}{dM} = \delta(\hat{x}_2 + 2\hat{x}_5 \Delta M) - \frac{h_o \frac{d\Gamma}{dM}}{1+\Gamma} -$$

$$\frac{2(1+\Gamma)\left( \hat{x}_8 c_1 \delta M^2 - \hat{x}_{10} \frac{W^2}{c_1 \delta M^2} \right)}{M}$$

$$\frac{dW_{fc}}{dM} = \frac{\delta \hat{x}_6 (b/q - 1)}{2a} - \frac{1}{q} \cdot \frac{dc}{dM}$$

n) Compute the total derivative of corrected fuelflow with respect to mach:

$$\frac{dW_f}{dM} = \frac{\partial W_f}{\partial M} + \frac{\partial W_f}{\partial W_{fc}} \cdot \frac{dW_{fc}}{dM}$$

o) Compute the partial derivative of specific range with respect to mach:

$$\frac{\partial S_R}{\partial M} = \frac{S_R + \frac{W_H}{W_f}}{M \left( 1 - \frac{W_c}{V_T} \right)^2}$$

where $W_c$ is crosswind p) Compute the total derivative of specific range with respect to mach at the desired mach:

$$\frac{dS_R}{dM} = \frac{\partial S_R}{\partial M} + \frac{\partial S_R}{\partial W_f} \cdot \frac{dW_f}{dM} = \frac{\partial S_R}{\partial M} - \frac{S_R}{W_f} \cdot \frac{dW_f}{dM}$$

Figure 10:
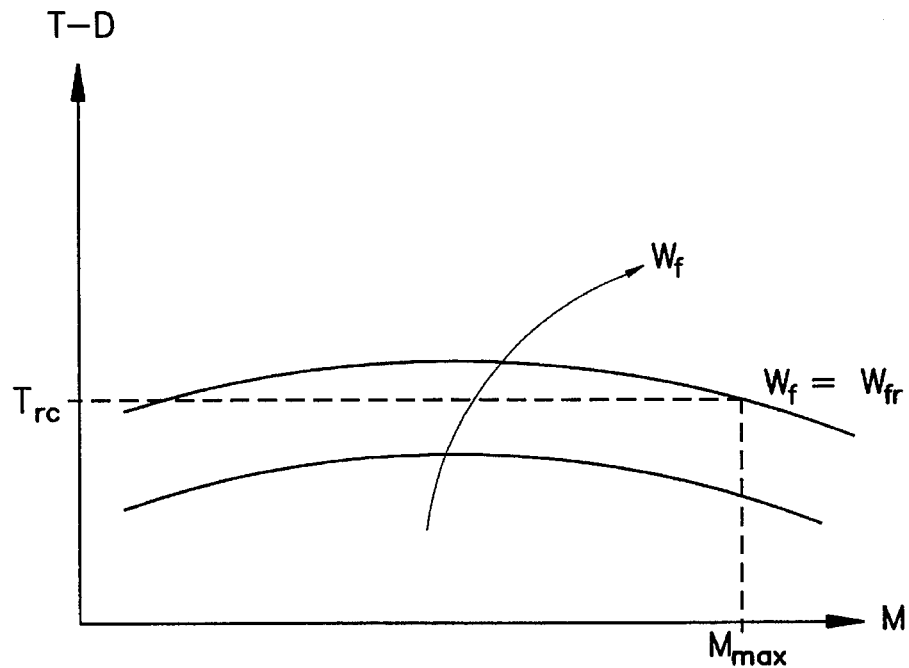
FIG. 10 is a graph utilized for determining maximum speed.

To determine maximum speed $M_{max}$ at fixed altitude, described with reference to FIG. 7B, the mach number M which drives T–D to $T_{rc}$ with fuelflow at the rated value ($W_f = W_{fr}$) is found. This is performed by "guessing" M and solving for $W_f$ and $$\frac{dW_f}{dM}$$

in a similar manner as done for the case of determining $M_{LRC}$. Performing this at two initial values of M allows the computation of $M_{max}$ to drive $W_f$ to equal $W_{fr}$ as shown in FIG. 10.

Maximum endurance speed, $V_{me}$, FIG. 7C, is first computed as:

$$V_{me_o} = V_{ref} + 10$$

where $$V_{ref} = \sqrt{\frac{2W\theta}{\rho_o \delta C_{L_{ref}} S}}$$

and $p_o$=standard sea level air density=0.00237692 slugs/ft$^3$.

$C_{L_{ref}}$=reference aircraft coefficient of lift-obtained from the specific aircraft data file.

$V_{me_o}$ is then checked for being thrust limited as follows:

$$V_{me} = \begin{cases} V_{me_o}, & (T-D)|_{V_{me_o}, W_{fr}} > T_{rc} \\ V_{TL}, & \text{otherwise} \end{cases}$$

where $V_{TL}$, thrust-limited speed is taken from the mach number M which drives $(T-D)|_{W_{fr}}$ to $T_{rc}$ as in the maximum speed case, the only difference being the smaller solution is chosen. In the special case where no solution exists, the M which maximizes $(T-D)|_{W_{fr}}$ is used.

Figure 11A:
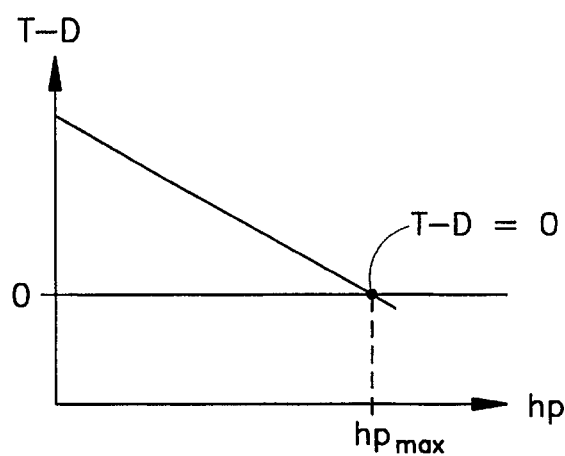
FIGS. 11A and 11B are graphs showing determination of optimum and maximum altitude of manual speed.
Figure 11B:
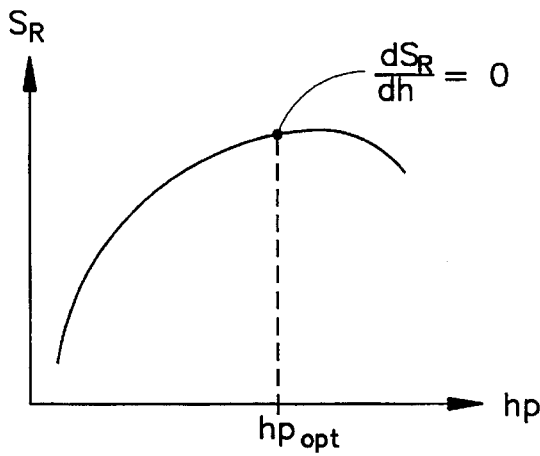

The prediction of manual speed mode, or optimal $h_{popt}$ or maximum altitude $h_{pmax}$ for manual speed, FIG. 7A, includes three submodes: a KCAS only, a Mach only, or both KCAS and Mach specified. Single dimension searches of $S_R$ and T–D are used to find $h_{popt}$ and $h_{pmax}$ altitude, respectively. In order to perform those searches, the $$\frac{dS_R}{dh_p}$$

and $$\frac{dT-D}{dh_p}$$

must include the $$\frac{dV_T}{dh_p}$$

for the different speed submodes. These can be derived from standard expressions and using a standard lapse rate. The max altitude $h_{pmax}$ search estimates the place where $(T-D)=0$ as shown by FIG. 11A, whereas the opt altitude $h_{popt}$ search finds where $$\frac{dS_R}{dh_p} = 0$$

as shown in FIG. 11B.

Figure 8A:
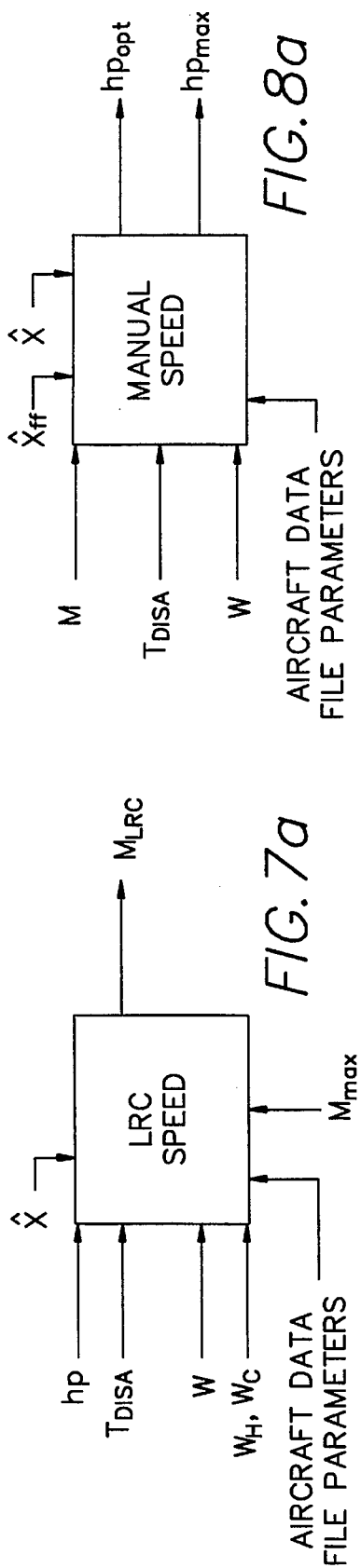
FIGS. 8A–8C, show method blocks for determining maximum and optimum altitude for manual, long range cruise, and maximum speed in accordance with the present invention.
Figure 8B:
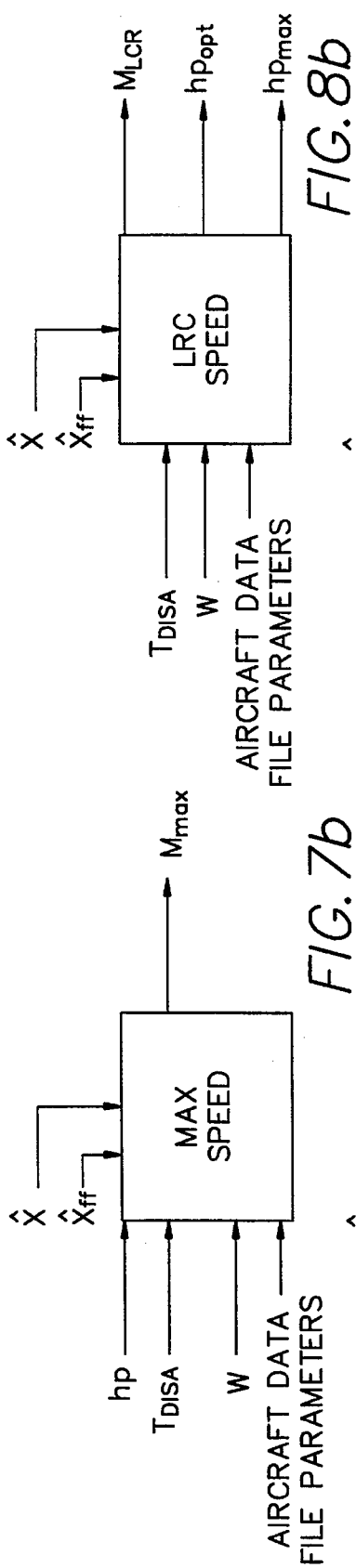
Figure 8C:
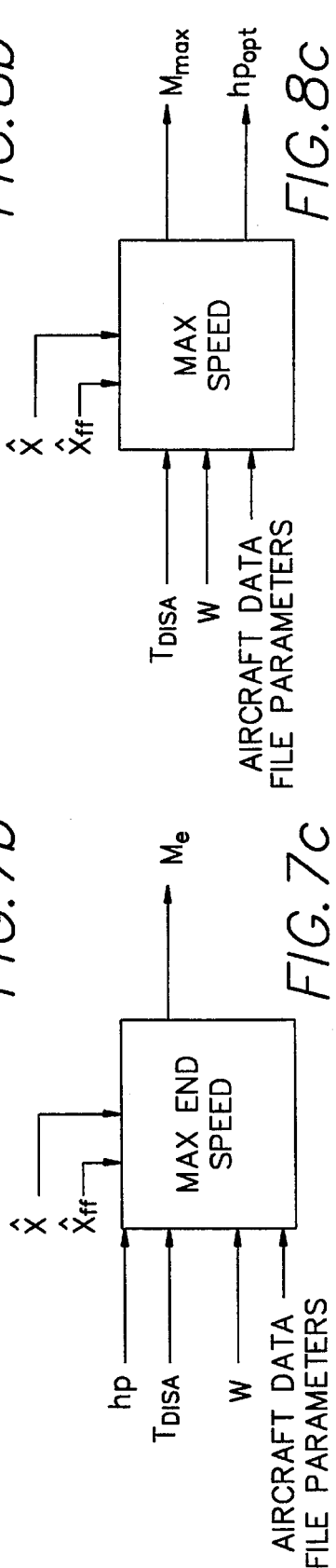

In the higher dimension cases, where there are n variables, the following general method is employed for finding optimum altitude $h_{popt}$ and maximum altitude for long range cruise speed $M_{LRC}$, FIG. 8B, or optimum altitude $h_{popt}$ for maximum speed $M_{max}$ at rated fuelflow $W_{fr}$, FIG. 8C. Gradients must be computed at each initial guess; the number of initial guesses exceeding the number of dimensions n by at least 1. The gradients are then used to fit a "second order surface" to the real surface on which the summit or other point of interest on the best fit surface is found. As the one dimensional case depends on the first derivative being approximately linear, this higher dimension method, depends on similar restrictions on the gradient, such that:

$$\nabla f \approx Ax+b$$

which implies that the surface itself may be expressed as:

$$f=\tfrac{1}{2}x^T Ax + b^T x + C = 0 \text{ for } A=A^T$$

Having chosen initial guesses, $x_o$, a "Matrix of Gradients" is expressed as:

$$\nabla F_o = \begin{bmatrix} \nabla f_{o_i}^T \\ \cdot \\ \cdot \\ \cdot \\ \cdot \\ \nabla f_{o_M}^T \end{bmatrix} \text{ where } \nabla f_{o_i}^T = \frac{\partial f}{\partial x}\bigg|_{x=x_{o_i}}$$

Since each $\nabla f_{o_i} \approx A x_{o_i} + b$ $$\nabla f_{o_i}^T \approx x_{o_i}^T A^T + b^T = \begin{bmatrix} x_{o_i}^T & 1 \end{bmatrix} \begin{bmatrix} A^T \\ b^T \end{bmatrix}$$

therefore:

$$\nabla f_o = \begin{bmatrix} x_{o_i}^T & 1 \\ \cdot & \cdot \\ \cdot & \cdot \\ \cdot & \cdot \\ x_{o_M}^T & 1 \end{bmatrix} \begin{bmatrix} A^T \\ b^T \end{bmatrix} = MC$$

Solving for C yields
$C=(M^T M)^{-1} M^T \nabla F_o$ if $m>n+1$, or $C=M^{-1}\nabla F_o$ if $m=n+1$, A and b are then easily extracted from C. If the point of interest is the summit of the surface, this point can be found from:

$$Ax+b \approx \nabla f = 0$$

then $$x_1 = -A^{-1} b$$

is the best estimate of where $\nabla f$ goes to zero.

Using this method, maximum speed $M_{max}$ and optimum altitude $h_{popt}$ therefor, FIG. 8C, are determined. Assuming that pressure altitude $h_p$ and true airspeed $V_T$ are the only independent variables, such that weight W and temperature $T_{DISA}$ are completely specified by $h_p$ and fuelflow $W_f$ is at the rated fuelflow value $W_{fr}$, then $W_{fr}$ is specified given $h_p$ and $V_T$.

Figure 12:
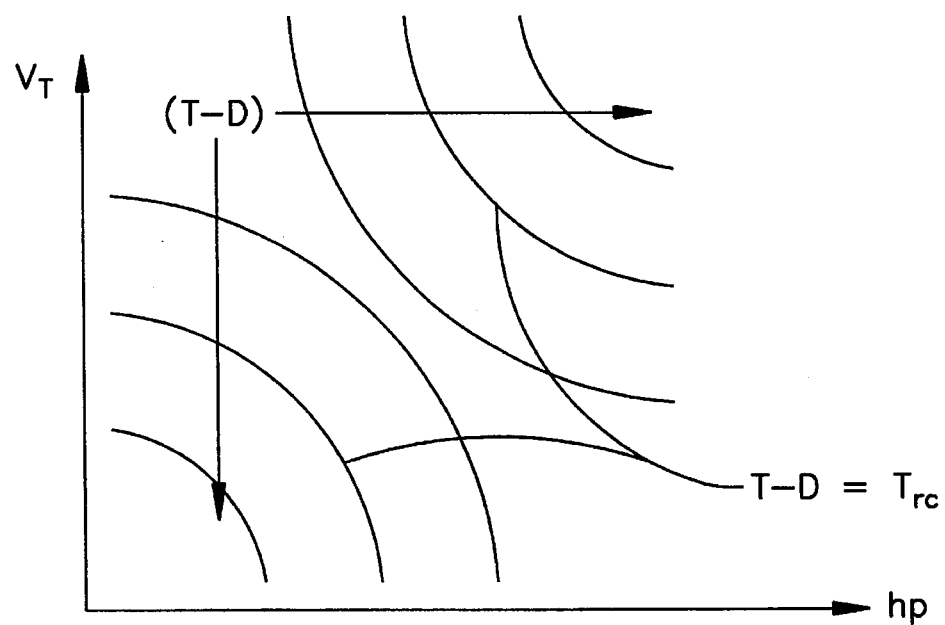
FIG. 12 is a contour graph showing thrust-minus-drag as a function of altitude and true airspeed.

Defining a residual climb thrust $T_{rc}$ as before, T–D as a function of $h_p$ and $V_T$ can be plotted in the form of a contour map as shown in FIG. 12. The point on the contour $T-D=T_{rc}$ which maximizes $V_T$ is the point at which maximum true airspeed occurs for any altitude subject to the constraint that the aircraft be able to initially maintain a rate of climb of 100 fpm. The coordinates of that point give the maximum airspeed $M_{max}$ and the altitude at which it will occur, the latter taken to be optimum altitude $h_{popt}$ for maximum speed $M_{max}$.

At any point on a given T–D contour, a tangent at that point is orthogonal to the gradient at that same point. Thus:

$$\nabla T_r(V_T, h_p) = \begin{bmatrix} \frac{\partial(T-D)}{\partial V_T} & \frac{\partial(T-D)}{\partial h_p} \end{bmatrix}^T_{V_T, h_p}$$

and $$\text{Tangent vectors} = \begin{bmatrix} \frac{\partial(T-D)}{\partial h_p} & -\frac{\partial(T-D)}{\partial V_T} \end{bmatrix}^T_{V_T, h_p} \text{ and}$$

$$\begin{bmatrix} -\frac{\partial(T-D)}{\partial h_p} & \frac{\partial(T-D)}{\partial V_T} \end{bmatrix}^T_{V_T, h_p}$$

The slope of the contours at a given point can then be expressed as:

$$\frac{dh_p}{dV_T}\bigg|_{V_T, h_p} = -\frac{\frac{\partial(T-D)}{\partial V_T}\big|_{V_T, h_p}}{\frac{\partial(T-D)}{\partial h_p}\big|_{V_T, h_p}} \text{ or } \frac{dV_T}{dh_p}\bigg|_{V_T, h_p} =$$

$$-\frac{\frac{\partial(T-D)}{\partial h_p}\big|_{V_T, h_p}}{\frac{\partial(T-D)}{\partial V_T}\big|_{V_T, h_p}}$$

The method for finding maximum speed $M_{max}$ and optimum altitude $h_{popt}$ arises from noting that $$\frac{dV_T}{dh_p} = 0$$

at maximum speed $M_{max}$ and optimum altitude $h_{popt}$. This condition manifests itself on the contour map as $$\frac{\partial(T-D)}{\partial h_p} = 0$$

which in conjunction with the fact that $T-D=T_{rc}$ gives the information required to move toward a final solution in both axes, simultaneously. The following steps are then performed:

1) Choose 3 initial guess points: $x_{o_a}$, $x_{o_b}$ and $x_{o_c}$, as follows:

$$x_{o_a} = [h_{po_a} V_{To_a}]^T$$

where
$h_{po_a}$=crossover altitude for $V_{mo}/M_{mo}$.
$V_{T_{oa}}$=maximum speed at $h_{poa}$ (max speed, fixed alt case)

$$x_{o_b} = x_{o_a} + [\Delta h_{po}\ 0]^T$$
$$x_{o_c} = x_{o_a} + [0\ \Delta V_{To}]^T$$

where
$\Delta h_{P_o} = 4000'$
$\Delta V_{T_o} = 0.05$ mach expressed as true airspeed
If $M_{o_a}$, the mach number corresponding to $V_{T_{oa}}$, is larger than $M_{mo}$, $M_{max}$ is taken to be $M_{mo}$ and $h_{popt}$ to be the crossover altitude and the algorithm is complete. Otherwise, 2) Compute the gradient of the T–D surface at the first initial point:

$$\nabla T(x_{o_a}) = \left[ \frac{\partial(T-D)}{\partial h_p}\ \frac{\partial(T-D)}{\partial V_T} \right]^T_{x_{o_a}}$$

and $$\frac{dV_T}{dh_p}\bigg|_{x_{o_a}} = -\frac{\frac{\partial(T-D)}{\partial h_p}\big|_{x_{o_a}}}{\frac{\partial(T-D)}{\partial V_T}\big|_{x_{o_a}}}$$

If $$\frac{dV_T}{dh_p}\bigg|_{x_{o_a}} < 0,$$

$V_{t_{max}}$ and $h_{popt}$ are found by solving the following simultaneous equations:

$$V_T = V_{T_{oa}} + \frac{dV_T}{dh_p}\bigg|_{x_{oa}}(h_p - h_{P_{oa}})$$

$$V_T = V_{T_1} + V_{h_1}(h_p - h_{P_{oa}})$$

where $$V_{T_1} = f(V_{mo}, h_{pmwr}, T_{DISA})$$

$$V_{h_1} = \frac{df}{dh_p}\bigg|_{V_{mo}}, h_{P_{xover}}, T_{DISA}$$

f is the well known function relating true airspeed to calibrated airspeed, altitude and temperature.
$M_{max}$ is then taken from $V_{T_{max}}$ and the algorithm is complete. Otherwise $$\frac{dV_T}{dh_p}\bigg|_{x_{oa}} \geq 0,$$

and the algorithm continues with step 3).

3) Assuming that (T–D) (x) can be approximately modeled as:

$$(T-D)(x) \approx (T-D)|_{x_{oa}} + \left( \frac{\partial(T-D)}{\partial x} \right)^T_{x=x_{oa}}(x - x_{o_a}) +$$

$$\frac{1}{2}(x - x_{0_a})^T \frac{\partial^2(T-D)}{\partial x \partial x^T}\bigg|_{x=x_{0_a}}(x - x_{0_a}) =$$

$$(T-D)_o + b^T\Delta x + \frac{1}{2}\Delta x^T A \Delta x$$

Then the gradient is:

$$\nabla T(x) \approx b + \frac{1}{2}(A + A^T)\Delta x = b + A\Delta x \text{ since } A = A^T$$

A and b can then be estimated from the values computed in Steps 3 and 4, and $$\nabla T = \begin{bmatrix} \nabla T^T(x_{0_a}) \\ \nabla T^T(x_{0_b}) \\ \nabla T^T(x_{0_c}) \end{bmatrix} = \begin{bmatrix} 0 & 1 \\ x_{0_b} - x_{0_a} & 1 \\ x_{0_c} - x_{0_a} & 1 \end{bmatrix} \begin{bmatrix} A^T \\ b^T \end{bmatrix} = MC$$

where $\nabla T(x_{o_b})$ and $\nabla T(x_{o_c})$ are completed in the same manner as $\nabla T(x_{o_a})$.

$$C = M^{-1}\nabla T$$

and A and b are extracted from C.

4) The best estimate of the point $x_1 = [h_{P1} V_{T_1}]^T$ (where $V_{T_1}$ is maximum speed and $h_{p1}$ is optimum altitude for maximum speed) is found from the constraints:

$$\nabla T(x_1) = A(x_1 - x_{o_a}) + b =$$

$$\begin{bmatrix} \frac{-\partial(T-D)}{\partial h_p} \\ \frac{\partial(T-D)}{\partial V_T} \end{bmatrix}_{h_{p_1} V_{T_1}} = \begin{bmatrix} 0 \\ \frac{\partial(T-D)}{\partial V_T}\big|_{h_{f_1} V_{t_1}} \end{bmatrix}$$

$$(T-D)(x_1) = (T-D)(x_{o_a}) + b^T(x_1 - x_{o_a}) + \frac{1}{2}(x_1 - x_{o_a})^T A(x_1 - x_{o_a}) = 0$$

Two simultaneous equations, one linear and one quadratic, in $h_{P1}$ and $V_{T_1}$ can then be written. The solution for which $$\frac{\partial(T-D)}{\partial V_T}\bigg|_{V_{T_1}, h_{f_1}} < 0$$

is correct.

5) The point $x_1$ then becomes the new $x_{o_a}$. New guesses for $x_{o_b}$ and $x_{o_c}$ are chosen which have an order of magnitude less displacement from $x_{o_a}$ than the displacement used on the first iteration. Steps 1–5 are then iterated until the movement in mach is less than 0.003 and the movement in altitude is less than 100 ft.

Figure 13:
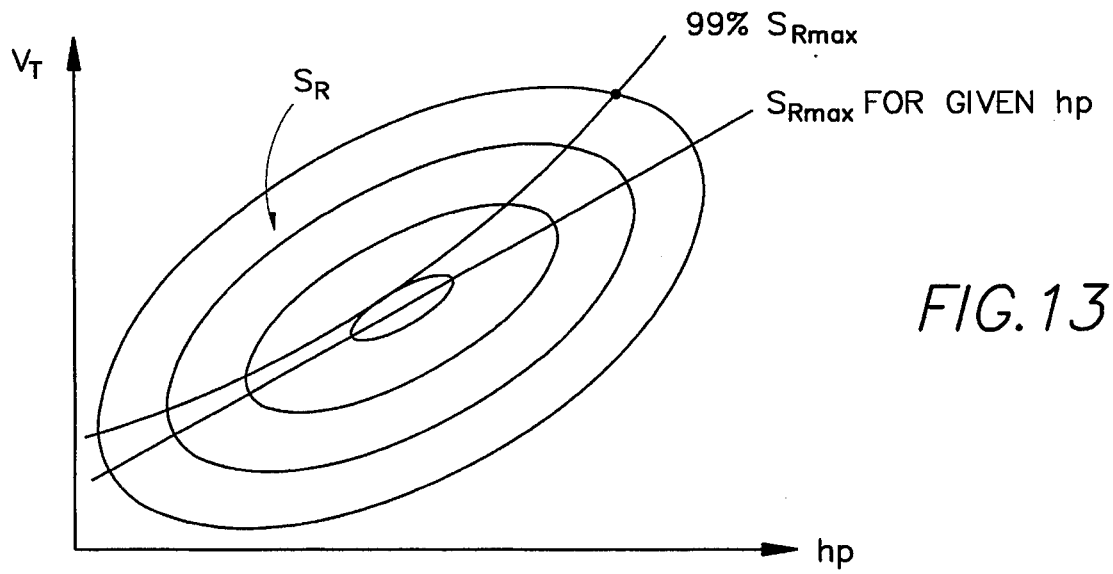
FIG. 13 shows a specific range surface defined for determining long range cruise speed.
Figure 14:
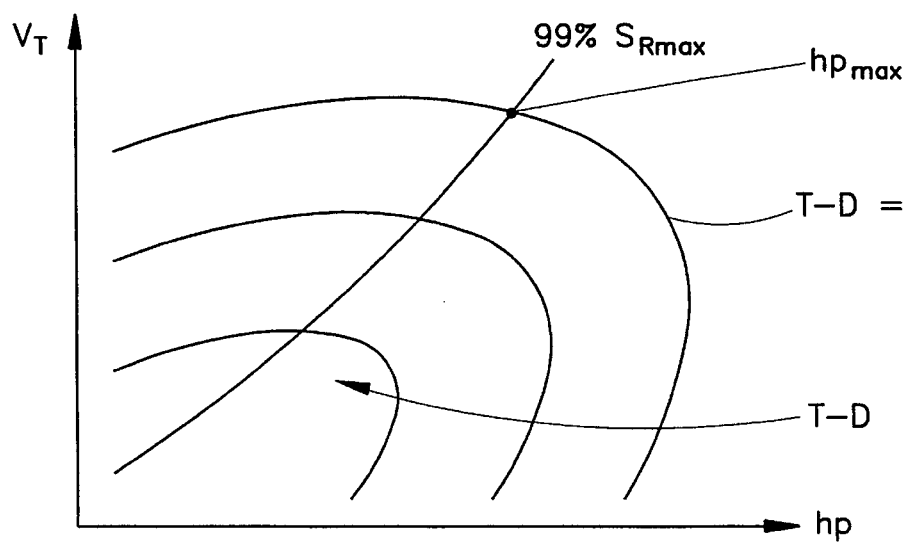
FIG. 14 shows a thrust-minus-drag surface defined for determining long range cruise speed.

The long range cruise speed $M_{LRC}$ and optimum altitude $h_{popt}$ and maximum altitude $h_{pmax}$ for $M_{LRC}$, FIG. 8B, is calculated in a similar manner as shown below:

a) Maximum altitude $h_{pmax}$ is found first because if the optimum altitude $h_{popt}$ is limited by the maximum altitude $h_{pmax}$, then no further iterations are required to find optimum altitude $h_{popt}$.

b) A seed mach $M_{seed}$ and altitude $h_p$ is chosen as an initial guess: $h_p = 0.9\ h_{ceil}$ where $h_{ceil}$ is the ceiling altitude in ft.

$$M_{seed} = 1.565 \sqrt{\frac{W}{1481(S)\delta}}$$

where S is wing area in ft$^2$ and $\delta$ is the atmospheric pressure ratio.

c) Based on this initial guess, $S_R$ and (T–D) surfaces are computed utilizing general surface search techniques as described previously with respect to determination of maximum speed. The T–D surface is computed using rated fuelflow as an input, and this therefore represents the maximum excess thrust at a given speed M and altitude $h_p$ and is shown in FIG. 14.

d) Long range cruise speed $M_{LRC}$ is defined to be where $S_R$ is 99% of the peak $S_R$ at the high speed side of the peak as shown in FIG. 13.

e) The maximum altitude $h_{pmax}$ for $M_{LRC}$ is the place where T–D=0 intercepts the 99% $S_R$ maximum line as shown by FIG. 14.

f) The maximum specific range $S_{R_{max}}$ is given by the following two conditions:

$$\nabla S = B_{SR} + A_{SR} \begin{bmatrix} h_p \\ V_T \end{bmatrix} = \begin{bmatrix} \frac{\partial S_R}{\partial h_p} \\ 0 \end{bmatrix} \quad \text{I}$$

$$S_R = S_o + B_{SR} \begin{bmatrix} h_p \\ V_T \end{bmatrix} + \frac{1}{2} \begin{bmatrix} h_p \\ V_T \end{bmatrix}^T A_{SR} \begin{bmatrix} h_p \\ V_T \end{bmatrix} \quad \text{II}$$

Equation I is solved to yield $V_T$ as a function of $h_{Po}$. Inserting $V_T$ into Equation II yields an expression for $S_{R_{max}}$ as a function of $h_p$.

g) The intercept on the T–D surface, representing $h_{pmax}$, FIG. 14, satisfies the following two conditions:

$$0.99 S_{R_{max}} = S_o + B_{SR} \begin{bmatrix} h_p \\ V_T \end{bmatrix} + \frac{1}{2} \begin{bmatrix} h_p \\ V_T \end{bmatrix}^T A_{SR} \begin{bmatrix} h_p \\ V_T \end{bmatrix} \quad \text{III}$$

$$0 = TD_o + B_{TD} \begin{bmatrix} h_p \\ V_T \end{bmatrix} + \frac{1}{2} \begin{bmatrix} h_p \\ V_T \end{bmatrix}^T A_{TD} \begin{bmatrix} h_p \\ V_T \end{bmatrix} \quad \text{IV}$$

By inserting the expression for $S_{R_{max}}$ as a function of $h_p$ into Equation III, the problem of estimating $h_p$ and $V_T$ is reduced to a standard two-equations-two-unknowns computational problem.

h) Optimum altitude $h_{popt}$ for $M_{LRC}$ is then found. If at the maximum altitude $$h_{pmax} \frac{\partial S_R}{\partial h_p} > 0,$$

then $h_{popt}$ is set equal to $h_{pmax}$. Otherwise, the $h_{popt}$ is determined at the point where $S_R$ peaks with respect to altitude $h_p$. This condition is written as:

$$\nabla S = B_{SR} + A_{SR} \begin{bmatrix} h_p \\ V_T \end{bmatrix} = \begin{bmatrix} 0 \\ \frac{\partial S_R}{\partial V} \end{bmatrix} \quad \text{V}$$

Once again, using Equation III and V, the problem becomes one of two-unknowns-two-equations.

In many systems, it is difficult to say how accurate the predictions are after a fixed number of flights, which is dependent on the learning portion 12. This accuracy problem arises because the degree of accuracy depends on the kinds of flights that have been flown, i.e. an operator whose first ten flights have "visited" all corners of the flight envelope will have a fairly settled and accurate system, whereas an operator whose first ten flights were essentially duplicates of one another will have significant changes occur in the learning portion 12 when the operator finally operates in these corners of the flight envelope. The present invention, however, provides an observable indicator shown as figure of merit 24, FIG. 1, which indicates accuracy of the current estimate of fuel remaining at the destination. The figure of merit, FOM, is determined utilizing the covariance matrix P along with Weight $W_{TOC}$, altitude $h_{Ptoc}$, speed $M_{fTOC}$ and fuelflow $W_{fTOC}$, all at top of climb, as follows:

$$FOM = \sqrt{H_T P_T H_T^T} \sqrt{\theta} (1+2M^2)^4 (t_{ETE})$$

where $H_T$ is comprised of the first seven terms of the normalized (T–D) H matrix evaluated with the aforementioned top-of-climb terms, $P_T$ is the upper left 7×7 portion of the (T–D) covariance P, and $t_{ETE}$ is estimated time enroute Those skilled in the art will recognize that only preferred embodiments of the present invention have been disclosed herein, that other advantages may be found and realized, and that various modifications may be suggested by those versed in the art. It should be understood that the embodiment shown herein may be altered and modified without departing from the true spirit and scope of the invention as defined in the accompanying claims.

What is claimed is:

1. An method for controlling the flight profile of an aircraft, said method comprising the steps of:

determining aircraft input parameters;

retrieving aircraft specific data from non-volatile memory;

retrieving learned coefficients from non-volatile memory;

modeling a thrust-minus-drag relationship of the aircraft with a first series expansion using said aircraft specific data, said input parameters, and said learned coefficients which define the performance characteristics;

learning coefficients of said at least one series expansion over at least one flight so that said learned coefficients can be utilized for predicting performance characteristics of subsequent flights;

finding at least one point of interest on curves representative of functions derived from said thrust-minus-drag relationship;

controlling said aircraft responsive to said at least one point of interest; and, storing said learned coefficients into non-volatile memory for use on subsequent flights.

2. A method according to claim 1, wherein said learning step includes the step of utilizing at least one filter to estimate said coefficients of said at least one series expansion.

3. A method according to claim 1, wherein said first series expansion is a Taylor series expansion.

4. A method according to claim 1, wherein said first series expansion includes first terms representative of thrust and second terms representative of drag, said second terms including a compressible drag portion.

5. A method according to claim 1, wherein said input parameters include altitude.

6. A method according to claim 1, wherein said modeling step further includes the step of modeling fuelflow with a second series expansion.

7. A method according to claim 6, wherein said learning step includes the step of utilizing a first filter for estimating coefficients of said first series expansion and a second filter for estimating coefficients of said second series expansion.

8. A method according to claim 7, wherein said first filter is an extended Kalman filter and said second filter is a Kalman filter.

9. A method according to claim 6, wherein said first and second series expansions are Taylor series expansions.

10. A method according to claim 1, wherein said learning step includes the steps of estimating an accuracy of said coefficients of said at least one series expansion to provide information as to an accuracy of performance characteristics predicted in subsequent flights.

11. A method according to claim 1, wherein said first series expansion includes first terms representative of thrust and second terms representative of drag, said second terms including a compressible drag portion which is a function of Mach number and Coefficient of lift.

12. A method according to claim 1, wherein said first series expansion includes first terms representative of thrust and second terms representative of drag, said second terms including a compressible drag portion defined substantially as:

$$\Gamma=0 \text{ when } M \leq M_{cr}$$

$$\Gamma=15(M-M_{cr})^2 \tan[(M-M_{cr})^2(C_L^3+0.1)\lambda] \text{ when } M>M_{cr}.$$

13. A method of predicting performance characteristics of an aircraft and controlling the flight said aircraft, said method comprising the steps of:

determining at least one input parameter;

retrieving aircraft specific data from non-volatile memory;

retrieving coefficients from non-volatile memory;

modeling a thrust-minus-drag relationship of the aircraft with at least one mathematical model using said aircraft specific data, said at least one input parameter, and said coefficients which define the performance characteristics;

learning said coefficients of said mathematical model over at least one flight;

predicting certain performance characteristics utilizing at least a first derivative taken with respect to at least one of said input parameters given certain predetermined conditions and said learned coefficients; and, controlling said aircraft according to said performance characteristics.

14. The method according to claim 13 further comprising the step of predicting certain performance characteristics utilizing at least a first derivative of at least one function derived from said at least one mathematical model taken with respect to at least one of said input parameters given certain predetermined conditions and said learned coefficients.

15. A method according to claim 14, wherein said modeling step includes the step of modeling said thrust-minus-drag relationship with a series expansion.

16. A method according to claim 15, wherein said modeling step further includes modeling fuelflow with an additional series expansion.

17. A method according to claim 16, wherein said learning step includes estimating said coefficients of said series expansion and said additional series expansion over at least one flight.

18. A method according to claim 17, wherein said predicting step further includes predicting climb performance characteristics of the aircraft as a function of said series expansion and/or said additional series expansion.

19. A method according to claim 18, wherein said predicting step further includes predicting descent performance characteristics of the aircraft as a function of said series expansion and/or said additional series expansion.

20. A method according to claim 18, wherein said predicting steps include performing step integrations over said series expansion and/or said additional series expansion.

21. A method according to claim 13, wherein said modeling step includes the steps of modeling a thrust-minus-drag relationship with a first mathematical model and modeling fuelflow with a second mathematical model.

22. A method according to claim 21, wherein said learning step includes the steps of utilizing a first filter to estimate coefficients of said first mathematical model and utilizing a second filter to estimate coefficients of said second mathematical model.

23. A method according to claim 22, wherein said modeling step includes the steps of modeling the thrust-minus-drag relationship with a first Taylor series expansion and modeling fuelflow with a second Taylor series expansion, and further wherein said learning step includes the steps of estimating coefficients of said first Taylor series expansion utilizing an extended Kalman filter and estimating coefficients of said second Taylor series expansion utilizing a Kalman filter.

24. A method according to claim 13, wherein said certain performance characteristics include cruise performance characteristics.

25. A method according to claim 24, wherein said predicting step includes the step of predicting long range cruise speed.

26. A method according to claim 25, wherein said predicting step includes the step of predicting optimum altitude for said predicted long range cruise speed.

27. A method according to claim 24, wherein said predicting step includes the step of predicting maximum speed.

28. A method according to claim 27, wherein said predicting step includes the step of predicting optimum altitude for said predicted maximum speed.

29. A method according to claim 24, wherein said predicting step includes the step of predicting optimum altitude at a manual speed.

30. A method according to claim 24, wherein said predicting step includes the step of predicting maximum endurance speed.

31. A method according to claim 13, wherein said learning step includes the step of utilizing previously learned coefficients from a separate flight of other like aircraft for predicting performance characteristics of a current flight and given flight plan.

32. A method according to claim 13, wherein said learning step includes the step of utilizing altitude as an input parameter in defining the performance characteristics.

33. A method according to claim 13, further including the step of predicting the accuracy of predictions of said certain performance characteristics.

34. A method according to claim 13, wherein said learning step includes the step of utilizing previously learned data from a separate flight of other like aircraft to initialize coefficients of said mathematical model.

35. A method of predicting performance characteristics of an aircraft and controlling said aircraft according to said characteristics, said method comprising the steps of:

determining at least airspeed, altitude and pitch of said aircraft;

retrieving aircraft specific data from non-volatile memory;

retrieving coefficients from non-volatile memory;

modeling thrust minus drag of said aircraft with at least one mathematical model using aircraft specific data and said airspeed, altitude and pitch of said aircraft;

predicting the performance characteristics as a function of said coefficients representative of a combined and non-independent thrust-minus-drag relationship; and, controlling said aircraft responsive to said predicted performance characteristics.

36. A method according to claim 35, wherein said method further includes estimating an accuracy of the performance characteristics predicted.

37. A method according to claim 35, wherein said predicting step includes the step of predicting certain performance characteristics utilizing at least a first derivative of a function derived from said mathematical model with respect to at least one input parameter given certain predetermined conditions.

38. A method according to claim 37 further comprising a step of learning coefficients of said at least one mathematical model.

39. A method according to claim 35, wherein said modeling step further includes the step of estimating modeling fuelflow with an additional mathematical model, said predicting step further includes the step of predicting performance characteristics as a function of said mathematical model and/or said additional mathematical model.

40. A method according to claim 39, wherein said predicting step further includes predicting performance characteristics of the aircraft for a given flight plan utilizing a closed-form integration technique.

41. A method according to claim 40, wherein said predicting step includes predicting time enroute, distance and/or total fuel burned for said given flight plan.

* * * * *